United States Patent
Leite et al.

(10) Patent No.: US 12,535,699 B2
(45) Date of Patent: Jan. 27, 2026

(54) FRAME ADJUSTMENT SYSTEM

(71) Applicant: Cubitts KX Limited, London (GB)

(72) Inventors: Jessy Leite, London (GB); Esteban Almiron, London (GB); Matt Hogbin, London (GB)

(73) Assignee: CUBITTS KX LTD, London (GB)

( * ) Notice: Subject to any disclaimer, the term of this patent is extended or adjusted under 35 U.S.C. 154(b) by 301 days.

(21) Appl. No.: 18/271,689

(22) PCT Filed: Jan. 11, 2022

(86) PCT No.: PCT/GB2022/050051
§ 371 (c)(1),
(2) Date: Jul. 11, 2023

(87) PCT Pub. No.: WO2022/148978
PCT Pub. Date: Jul. 14, 2022

(65) Prior Publication Data
US 2024/0061278 A1    Feb. 22, 2024

(30) Foreign Application Priority Data

Jan. 11, 2021 (GB) ..................................... 2100314

(51) Int. Cl.
*G02C 13/00* (2006.01)
*G06T 7/73* (2017.01)
(Continued)

(52) U.S. Cl.
CPC .............. *G02C 13/005* (2013.01); *G06T 7/73* (2017.01); *G06V 10/764* (2022.01);
(Continued)

(58) Field of Classification Search
CPC .... G02C 13/005; G02C 13/003; G02C 7/027; G02C 7/028; G06T 7/73;
(Continued)

(56) References Cited

U.S. PATENT DOCUMENTS 9,086,582 B1 * 7/2015 Barton .................... A61B 3/111
9,429,773 B2 * 8/2016 Ben-Shahar ............. G02C 7/02
(Continued)

FOREIGN PATENT DOCUMENTS

EP      3214595 A1    3/2017
EP      3425447 B1    1/2019
(Continued)

OTHER PUBLICATIONS

Japanese Office Action for Patent Application 2023-541896, dated Apr. 16, 2025.
(Continued)

*Primary Examiner* — Michael S Osinski
(74) *Attorney, Agent, or Firm* — Troutman Pepper Locke LLP

(57) ABSTRACT

A computer-implemented method of adjusting a spectacle frame for a user to provide a customised spectacle frame, comprising the steps of receiving input data comprising three-dimensional coordinate data representing a user's head; identifying a plurality of landmark locations within the input data, wherein a landmarks location corresponds to a three-dimensional position of a facial feature; determining a set of facial measurements based on the plurality of landmark locations by calculating at least one measurement associated with at least one landmark location; retrieving a set of frame measurements representing a base spectacle frame from a database of frame measurements; comparing the set of facial measurements with the set of frame measurements; adjusting at least one frame measurement in the set of frame measurements based on the comparison; outputting a data file comprising a set of adjusted frame measurements; wherein the set of frame measurements comprises a lens height measurement and the adjusting (Continued)

comprises adjusting the lens height measurement from an initial value to an adjusted value.

13 Claims, 19 Drawing Sheets

(51) Int. Cl.
*G06V 10/764* (2022.01)
*G06V 10/774* (2022.01)
*G06V 10/776* (2022.01)
*G06V 10/82* (2022.01)
*G06V 40/16* (2022.01)
*H04N 23/20* (2023.01)

(52) U.S. Cl.
CPC .......... *G06V 10/774* (2022.01); *G06V 10/776* (2022.01); *G06V 10/82* (2022.01); *G06V 40/171* (2022.01); *H04N 23/20* (2023.01); *G06T 2207/10028* (2013.01); *G06T 2207/20081* (2013.01); *G06T 2207/20084* (2013.01); *G06T 2207/30201* (2013.01)

(58) Field of Classification Search
CPC . G06T 2207/10028; G06T 2207/20081; G06T 2207/20084; G06T 2207/30201; G06T 2219/2016; G06T 19/20; G06T 2219/2004; G06V 10/764; G06V 10/774; G06V 10/776; G06V 10/82; G06V 40/171; G06V 20/64; G06V 40/168; H04N 23/20; G06N 3/045; G06N 3/0464; G06N 3/08; G06N 3/09; A61B 3/111; A61B 3/024; A61B 2090/3937; A61B 2090/502; A61B 3/0025
See application file for complete search history.

(56) References Cited

U.S. PATENT DOCUMENTS

| | | | | |
|---|---|---|---|---|
| 10,108,028 | B2 | 10/2018 | Rego et al. | |
| 10,330,958 | B2* | 6/2019 | Fonte | B29D 12/02 |
| 11,313,759 | B2* | 4/2022 | Glasenapp | G01M 11/0235 |
| 11,333,906 | B2* | 5/2022 | Ohlendorf | G01M 11/0228 |
| 11,676,347 | B2* | 6/2023 | Goldberg | G06Q 30/0643 |
| | | | | 345/419 |
| 11,707,191 | B2* | 7/2023 | Xiong | A61B 5/1079 |
| | | | | 600/558 |
| 11,915,381 | B2* | 2/2024 | Schwarz | G06T 19/20 |
| 12,067,689 | B2* | 8/2024 | Varady | G06T 7/74 |
| 12,094,248 | B2* | 9/2024 | Inoue | G06V 10/50 |
| 12,165,357 | B2* | 12/2024 | Barton | G06V 40/171 |
| 12,329,453 | B2* | 6/2025 | Kashem | G02B 27/017 |
| 12,360,404 | B2* | 7/2025 | Bonnin | G06V 10/34 |
| 2009/0128579 | A1* | 5/2009 | Xie | G02C 13/005 |
| | | | | 345/634 |
| 2015/0055085 | A1 | 2/2015 | Fonte et al. | |
| 2015/0127132 | A1* | 5/2015 | Nyong'o | B29D 12/02 |
| | | | | 700/98 |
| 2015/0293382 | A1* | 10/2015 | Jethmalani | G02C 13/003 |
| | | | | 351/204 |
| 2016/0103335 | A1 | 4/2016 | Ben-Shahar | |
| 2016/0299360 | A1* | 10/2016 | Fonte | G02C 7/027 |
| 2018/0336737 | A1 | 11/2018 | Varady et al. | |
| 2019/0271858 | A1* | 9/2019 | Nieuwenhuis | G06T 7/12 |
| 2019/0377201 | A1 | 12/2019 | Fonte et al. | |
| 2020/0107720 | A1* | 4/2020 | Xiong | A61B 3/024 |
| 2020/0219326 | A1* | 7/2020 | Goldberg | G06T 19/20 |
| 2020/0319482 | A1* | 10/2020 | Schwarz | G06T 19/20 |
| 2021/0088811 | A1* | 3/2021 | Varady | G06V 40/171 |
| 2022/0276511 | A1* | 9/2022 | Varady | G06V 40/171 |
| 2023/0221585 | A1* | 7/2023 | Metka | G02C 13/005 |
| | | | | 351/178 |
| 2024/0069366 | A1* | 2/2024 | Andoche | G06V 40/193 |

FOREIGN PATENT DOCUMENTS

| | | |
|---|---|---|
| JP | 2016537716 A | 12/2016 |
| JP | 2019109313 A | 7/2019 |
| JP | 2020525858 A | 8/2020 |
| WO | 200188654 A1 | 11/2001 |
| WO | 2016164859 A1 | 10/2016 |
| WO | 2016176630 A1 | 11/2016 |
| WO | 2017196948 A1 | 11/2017 |
| WO | 2021062440 A1 | 4/2021 |

OTHER PUBLICATIONS

GB Application No. GB2100314.0, Search Report, dated, Jun. 1, 2021.

PCT/GB2022/050051, dated Jan. 11, 2022, ISR/WO, dated Jul. 22, 2022.

* cited by examiner

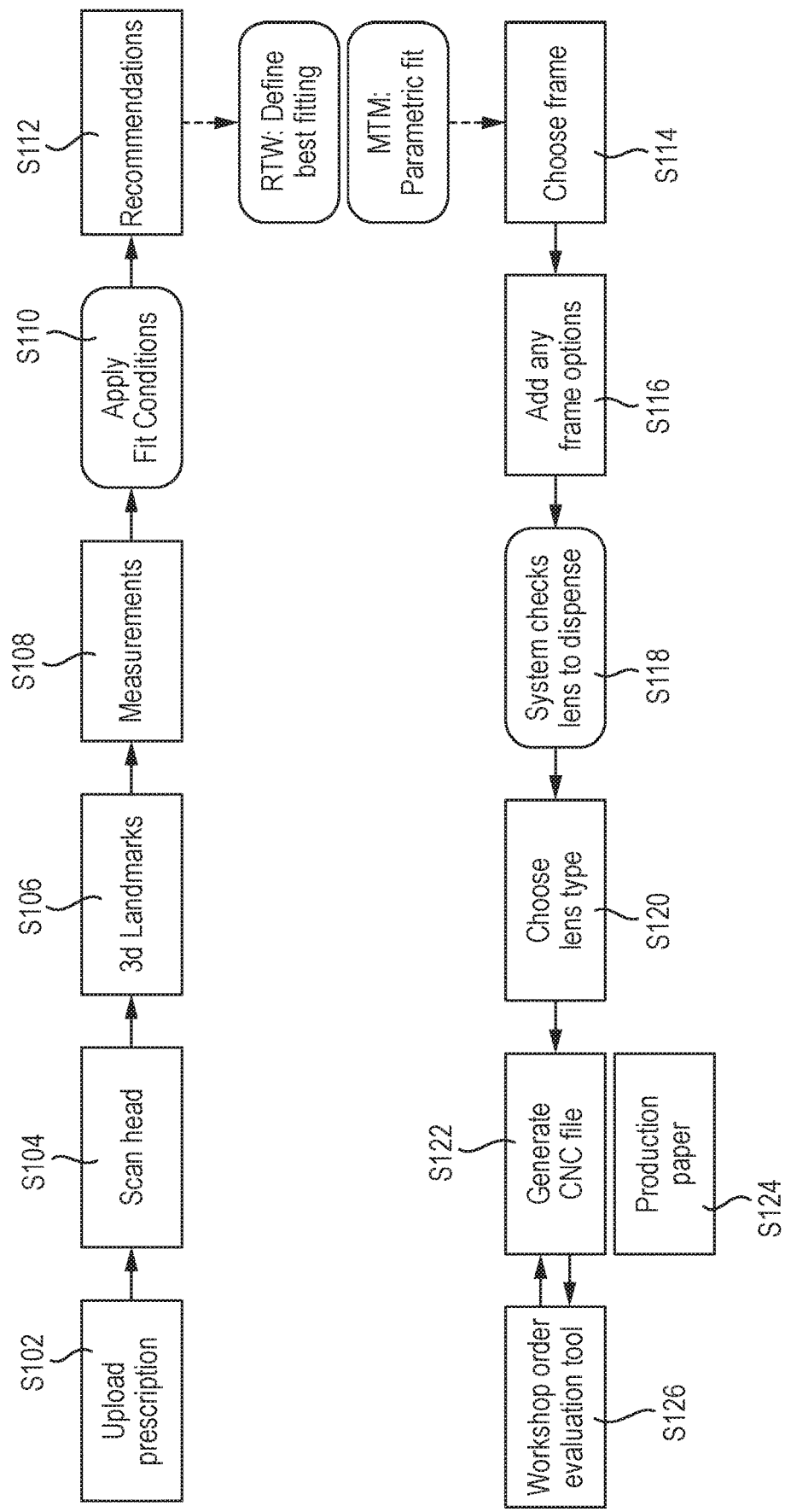

Fig. 9
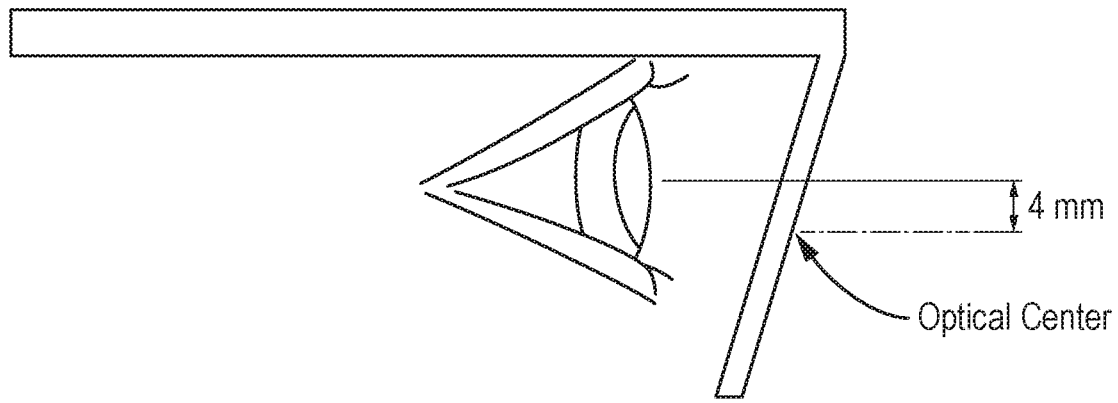
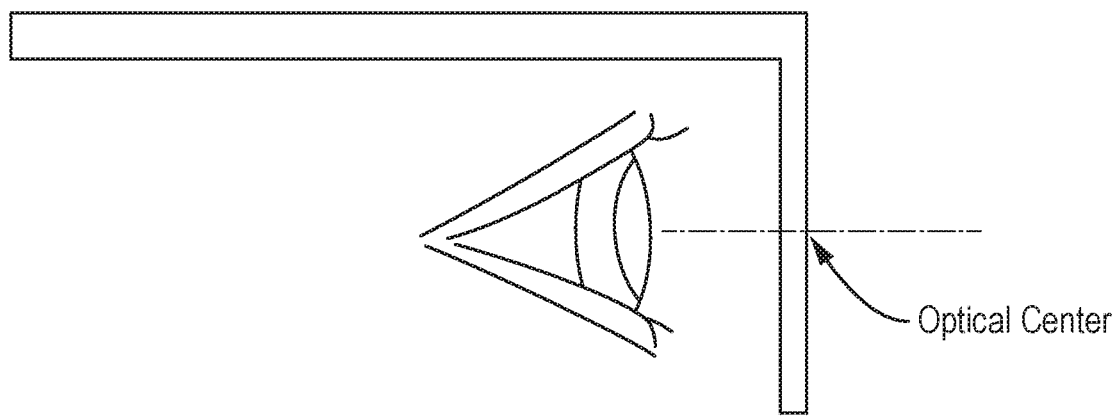

Fig. 13
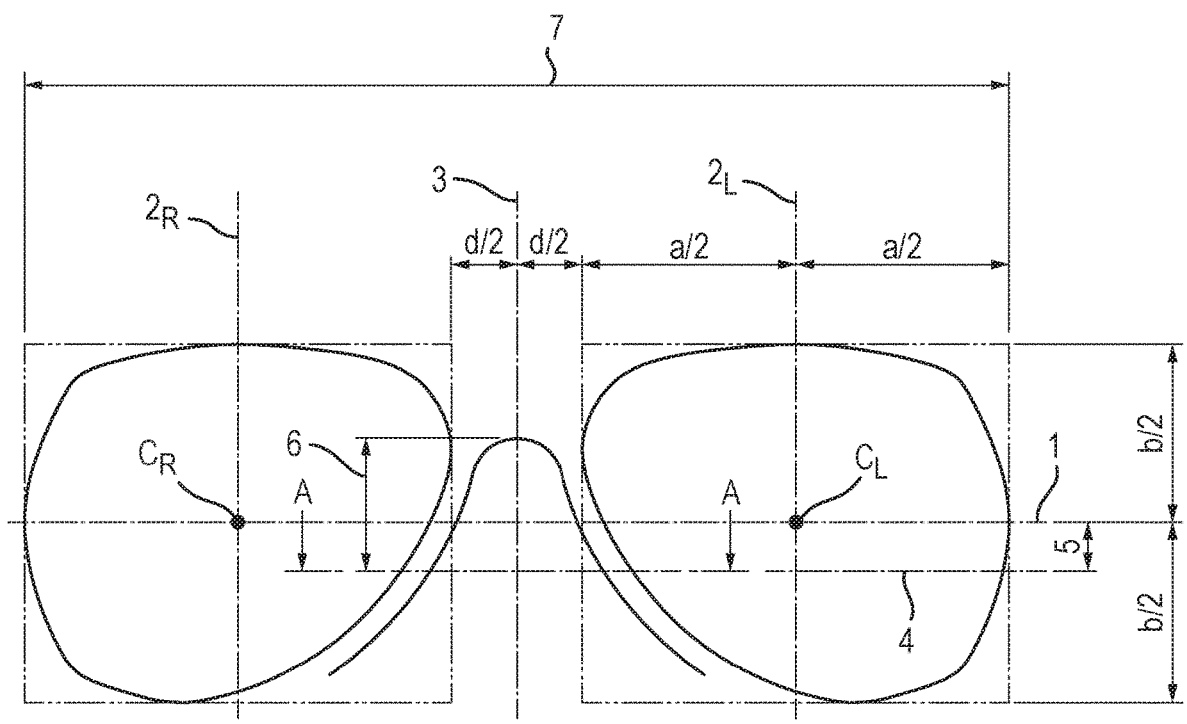
A-A
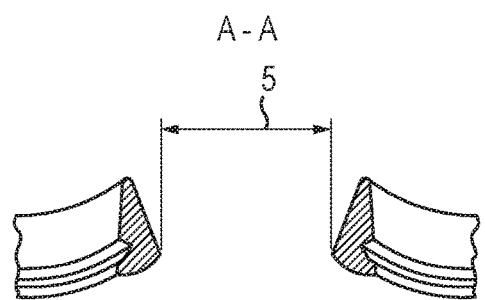

Fig. 14
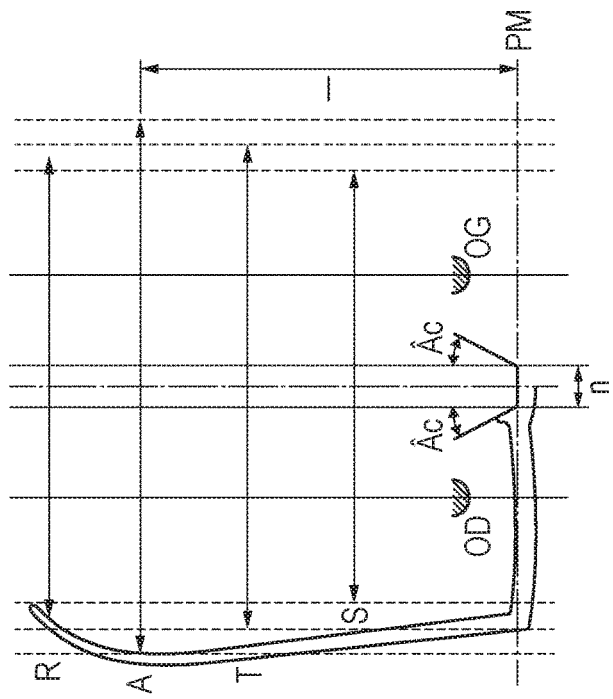
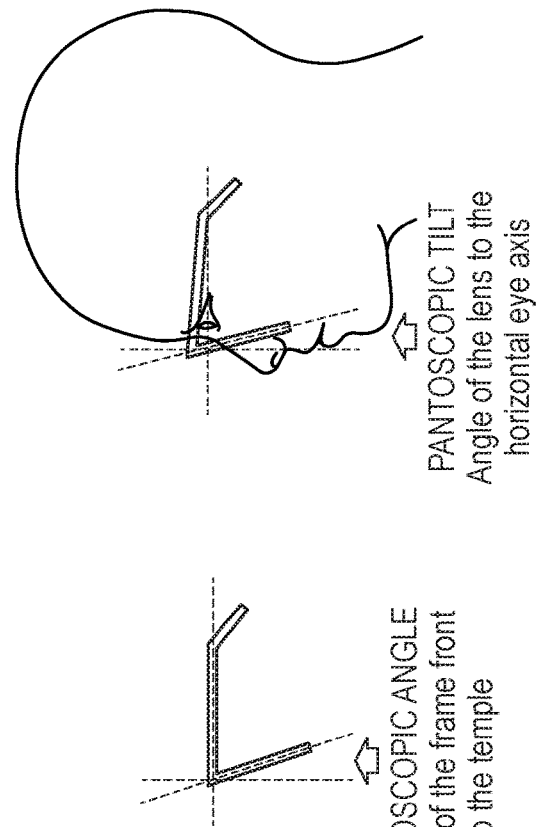
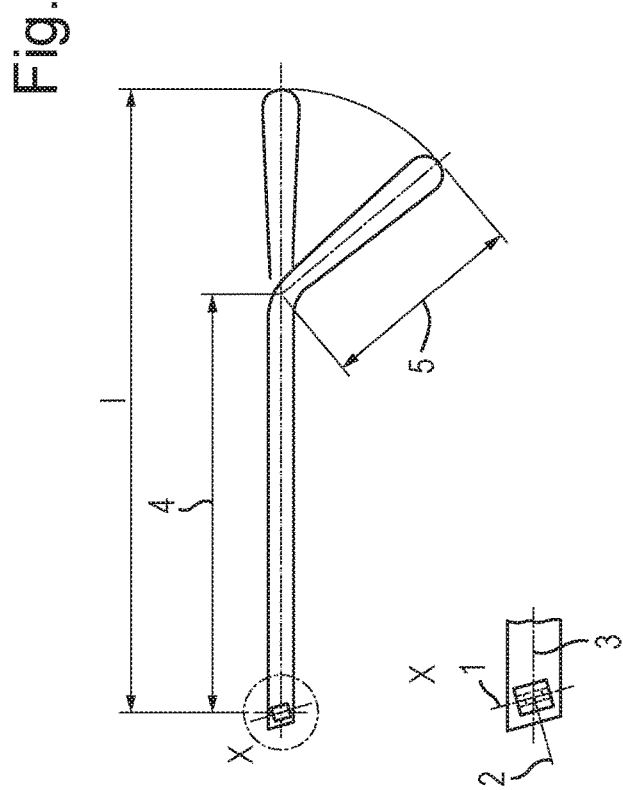
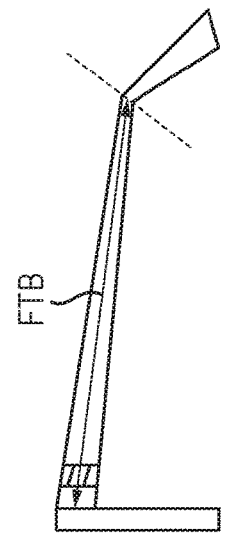

FRAME ADJUSTMENT SYSTEM

CROSS-REFERENCE TO RELATED APPLICATION

This application is based on International Application No. PCT/GB2022/050051, filed 11 Jan. 2022, which claims priority from Great Britain Application No. 2100314.0, filed on 11 Jan. 2021, which is hereby incorporated by reference in its entirety.

BACKGROUND

A spectacle frame has the main task of holding a pair of lenses, of the required power and type, in the correct position and angle in front of a wearer's eyes to improve their vision.

A well-fitting pair of glasses, or spectacles, needs to satisfy a number of key criteria in order to function properly in correctly positioning the lenses relative to the user's pupils in order to provide the wearer with improved vision.

1. Optimises the Optical Performance

To provide optimal visual correction to the wearer, a frame should allow the optical centre of the lenses to be positioned properly before the eyes.

The optical centre of the lens of the correct power and type should be placed in front of the pupils, horizontally (in the x-axis of the Cartesian coordinate system, via an accurate pupillary distance measurement), vertically (in the y-axis of the Cartesian coordinate system, via an accurate heights measurement).

The lens should sit also perpendicular to the vertical plane. That is, when the pupil corresponds to the optical centre of the lens, there should be no pantoscopic tilt. Any lens tilt added will change the sphere power of the lens and cause an unwanted cylinder component to be manifested. For low power lenses, the power effect is negligible, but with a higher power lens it can be quite evident.

The chosen frame should work for the specific prescription types, encompassing higher index single vision lenses, aspherics, progressive lenses, and so on.

2. Maximises the Field of View

A primary purpose of the lens is to maximise the wearer's field of view. Because field of view is increased and magnification decreased as plus lenses are moved closer to the eyes, the frame should hold the lenses as close as possible to the eyes, minimising vertex distance, subject to eyelashes, cheek bones and other impediments. The wearer's eyelashes should just clear the back surfaces of the lenses.

The chosen frame should work for the unique and specific facial features of the wearer, encompassing, bridge height, bridge projection, nasal size and shape, head size, asymmetry, and so on.

3. Holds Alignment

Frames should be chosen for their ability to hold their alignment, and should minimise movement and not slide down the nose.

This is not only irritating to the wearer, but also has some rather serious optical side effects. These include: 1. The blurring of distance vision as a result of an increased effective lens power; 2. A smaller field of view; 3. An increase in the magnification of objects viewed by the wearer; and 4. An increase in the apparent size of the wearer's eyes to an observer (as the vertex distance decreases for plus lenses, the wearer's eyes look less magnified when viewed by an observer)

4. Offers Comfort

When worn, the spectacle frame and lenses should be comfortable to the wearer. It should seek to distribute the weight of the frame evenly across the surface of the bridge, and the position on the ears. There should be no points where the frame is too tight.

In order to provide a wearer with a pair of spectacles that provides the required visual correction, a spectacle frame can be tailored or adjusted to fit the wearer's face based on measurements taken of the wearer's head.

Currently, there are four main methods of taking these measurements, outlined below.

The first, and most commonly used, is trial and error—a wearer, with or without the assistance of an optical or sales associate, trying on frames until they find one they are satisfied with, typically using the frame measurements written on the inside temple for guidance. Given that these measurements are not directly related to a frame's fit when worn, combined with a generally poor understanding of optical fit, this approach typically leads to unsatisfactory results.

The second method involves an optician manually taking measurements of the wearer's head with a ruler, by marking various points on the wearer's face with a pen and then measuring the distance between these marked points. This method has a number of inherent inaccuracies associated with it. For example, human error in making the initial mark and in taking the actual measurement, the patient or the measurer moving during the measuring process, and facial asymmetries. In addition, the width of the pen becomes significant, when dealing with the small measurements associated with facial features, and so this introduces further inaccuracies into the measuring process.

The third method involves taking measurements using an electronic measuring tool, for example using a pupilometer to measure the distance between the wearer's pupils. Whilst an electronic measuring tool can reduce some of the problems associated with manual measuring there are still some systematic inaccuracies which arise even with advanced electronic equipment. For example, an electronic measuring tool cannot eliminate inaccuracies associated with incorrect positioning of the measuring tool by the measurer.

The fourth method involves using a static image or photo of the wearer's head and using a datum or scaling device to take measurements. This is sometimes referred to as the online "credit card" technique, in which one edge of the credit card is placed at the centre of the wearer's nose and the point at which the credit card ends is measured. A problem with this method is that it can be hard to ensure that the credit card is positioned in the correct vertical plane, when overlaid on the image of the wearer's face, leading to inaccurate measurements being taken. Furthermore, the curvature of the camera, as well as inconsistencies between lens curvature, introduce small distortions into the image which leads to inaccurate measurements.

Thus, as is evident, there are many inherent problems associated with providing a wearer with a pair of glasses which has been suitably adjusted to their head such that the glasses hold the lens in the correct position relative to the wearer's pupils.

In this regard there are a number of key parameters which are important to measure accurately in order to be able to adjust a spectacle frame correctly. These parameters include the pupil distance, the vertex distance, the pantoscopic tilt, and the lens segment height.

Pupil distance is important because if a wearer is not looking through the optical centre of a lens, the resulting incorrect power and induced prismatic power could be affecting the clarity and comfort of their vision. In relation to pantoscopic tilt, most lenses in frames are not positioned perpendicular to the vertical plane which can induce changes in the prescription power of the lens. In terms of vertex distance, as the vertex distance of a lens is altered, the dioptric power of light reaching the front of the cornea is also altered, affecting the ability of the lens to provide the required visual correction to the wearer. Finally, if the height measurement is not accurate then the wearer may be looking through the incorrect prescription power in primary gaze rather than secondary gaze.

As such, there is a need to provide a method of adjusting a pair of spectacles to an individual's head in order to correctly place the lenses relative to the individual's pupils.

SUMMARY OF INVENTION

According to a first aspect there is provided a computer-implemented method of adjusting a spectacle frame for a user to provide a customised spectacle frame, comprising the steps of: receiving input data comprising three-dimensional coordinate data representing a user's head; identifying a plurality of landmark locations within the input data, wherein a landmarks location corresponds to a three-dimensional position of a facial feature; determining a set of facial measurements based on the plurality of landmarks locations by calculating at least one measurement associated with at least one landmark location using the landmark locations; retrieving a set of frame measurements representing a base spectacle frame from a database of frame measurements; comparing the set of facial measurements with the set of frame measurements; adjusting at least one frame measurement in the set of frame measurements based on the comparison; outputting a data file comprising a set of adjusted frame measurements; wherein the set of frame measurements comprises a lens height measurement and the adjusting comprises adjusting the lens height measurement from an initial value to an adjusted value.

In this context, a measurement can include an angle, for example the angle at which the nose projects from the face, or a distance between two points, for example the distance between pupils. In these examples, the nose and the pupils are the landmark locations corresponding to the associated angle and distance measurement respectively.

Further, in this context, providing a customised spectacle frame refers to providing a spectacle frame that has been tailored to fit a user's head such that the lens position relative to the user's pupil has been adjusted, allowing the lenses to provide the desired optimal optical correction for that particular user. In other words, a customised spectacle frame is a spectacle frame which holds the lens in the vertical position relative to a wearer's pupils which provides maximum visual correction.

The present invention therefore provides a method of adjusting at least one frame measurement in order to ensure maximal visual correction for the wearer. In particular, the frame measurements that are adjusted are the frame measurements which help control the position of the lens relative to the pupil.

The lens height represents the distance between the lowest part of the lens and the point on the lens corresponding to the height of the pupil centre. In order that the lens provides the desired visual correction, it is important to ensure that the point on the lens corresponding to the height of the pupil centre is aligned with the actual pupil centre.

Adjusting the lens height is therefore important in order to ensure that the lens is providing the required optical correction to the user. In particular, the vertical position of the optical centre of the lens relative to the pupil needs to be correct, for the user's prescription, in order to minimise the effects of aberrations and prismatic effect whilst maximising the visual correction. Since each user's face is generally different from another user's face, adjusting the lens height position is critical in order for the lens to provide the required optimal correction for each user.

The set of facial measurements preferably comprises a plurality of nasal measurements representing the 3D structure of the nose. The nose is an important facial feature in terms of ensuring that a spectacle frame sits correctly on the user's face, as it is the nose that provides the main support location for the front of the spectacle frame, namely the frame bridge. It is therefore important to accurately represent the size and shape of each user's nose so that the frame bridge can be adjusted and sized appropriately for each user, so that the spectacle frame and lenses are positioned correctly on the user's face relative to their pupils.

The way in which the spectacle frame rests on the wearer's nasal bridge will have an effect on the lens height position and where the centre of the lens is held relative to the wearer's pupil centre. Determining a set of facial measurements comprising a plurality of nasal measurements that represent the 3D structure of the nose helps predict how the spectacle frame will sit on a wearer's nasal bridge and subsequently where the lens centre will be positioned relative to the wearer's pupil centre. This prediction then allows the lens height to be suitably adjusted such that the desired optical correction achieved by the spectacle frame is realised.

Preferably, the plurality of nasal measurements comprise a plurality of distance between rim, DBR, measurements, wherein each DBR measurement is taken at a different y-axis location along the length of the nose. Taking multiple measurements along the length of the nose helps build up a more accurate representation of the shape of the nose. The bridge of the nose is that part of the nose that supports the spectacle frame, and so it is important to understand the structure of the nasal bridge so that suitable adjustments can be made to the spectacle frame. Multiple nasal measurements along the y-axis therefore enables a more accurate structure of the nasal bridge to be determined. By y-axis we mean a vertical or longitudinal axis relative to the user.

There is an interplay between how the spectacle frame sits on the wearer's face and the position at which the lens are held relative to the pupils. If the frame is not sitting correctly on the nose then the lenses will not be held correctly relative to the pupil centre. Accurate representation of the structure of the nose allows accurate prediction of how the lens will be held in the frame in relation to the wearer's pupils, in particular the lens height, the pantoscopic tilt, the vertex distance. If the prediction indicates that optical correction for the wearer is suboptimal, then suitable adjustments can be made to the frame to adjust the lens height measurement such that the lens is repositioned to align with the pupil centre at the correct tilt and vertex distance.

In some examples, the plurality of nasal measurements are obtained by: ray casting along an x-axis at a first y-coordinate (based on the Cartesian coordinate system) to acquire nasal coordinate data and storing the nasal coordinate data in a nasal dataset; adjusting the first y-coordinate by an interval to a second y-coordinate and ray casting along the x-axis at the second y-coordinate to acquire additional nasal coordinate data and storing the additional nasal coordinate data in the nasal dataset; retrieving the nasal coordinate data from the nasal database; retrieving frame bridge data; comparing the nasal coordinate data with the frame bridge data; determine a size of an overlap area between the nasal coordinate data and the frame bridge data; and if the size of the overlap is less than a threshold value, adjusting at least one frame measurement. This method enables a more accurate determination of the sit position for the fulcrum of the frame bridge when the spectacle frame is placed on the user's nose. There must be sufficient contact area between the frame bridge and the nose, at the sit position, such that the spectacle frame does not slip down the user's face and can be worn comfortably. This obtaining method therefore provides a better understanding of the structure of the nose, allowing the sit position of the frame to be adjusted for each user.

The step of comparing may comprise mapping the set of frame measurements onto the set of facial measurements and identifying a subset of frame measurements which need to be adjusted. The mapping may be a conceptual map in that the data representing the size and structure of the spectacle frame is compared to the data representing the size and structure of the face. This allows parts of the frame which are not appropriately sized for the user to be identified. Since it is not always that case that all frame measurements need to be adjusted, identifying a subset of frame measurements which need to be adjusted ensures that only parts of the frame which need to be corrected are adjusted. In this case, the parts of the frame which need to be adjusted refer to parts of the frame that will adjust the position of the lenses relative to the pupils so that the lenses are providing the required optical correction for that user.

Preferably, the step of adjusting comprises adjusting the identified subset of frame measurements. This ensures that only the frame measurements which will positively affect the position of the lens relative to the user's pupil need to be adjusted, rather than adjusting all the frame measurements. By positively affect we mean that the adjustment will cause the position of the optical centre of lens to be better placed relative to the user's pupils, at the appropriate vertex distance and angle, so that the lens can provide the best optical correction for that user.

In some cases, the identified subset of frame measurements comprises at least one frame measurement related to a bridge of the spectacle frame. The bridge of the spectacle frame is the part of the frame that comes to rest on the user's nose. Therefore the position of the bridge of the spectacle frame relative to the user's nose will define the position of the lens relative to their pupils. Therefore by adjusting a frame measurement related to the frame bridge, the position at which the frame rests on the user's nose can be adjusted to ensure that the position of each lens relative to each pupil is correct for the user's prescription.

The identified subset of frame measurements may comprise at least one measurement related to the position of different areas of a lens within the spectacle frame.

In progressive multifocal lenses (also called progressives, progressive addition lenses, and PALs) the power can gradually change within the lens, typically from the top to the bottom of the lens, offering a large number of powers for clear vision at all distances—distance, intermediate, near and everywhere in between. It is therefore important to ensure that the lens is positioned correctly relative to the pupils to ensure that the lens provides the user with the desired and optimal optical correction for that specific user.

Preferably, the step of adjusting the lens position comprises separately adjusting a lens position measurement associated with the user's left pupil and a lens height measurement associated with the user's right pupil. It is often the case a user's left pupil and right pupil are not exactly in line with each other, by which we mean that they are not at the same vertical distance (along the y-axis) on the user's face. It is therefore important to measure the position of the left and right pupil separately so that the position of the left and right lens can be adjusted accordingly to ensure that each lens is positioned correctly to its respective pupil. Taking separate measurements for each pupil therefore ensures that the vertical position of each lens is optimal meaning that each lens is able to provide maximal optical correction for the user.

The step of adjusting the at least one frame measurement may comprise applying at least one fit rule to the frame measurement and adjusting the at least one frame measurement such that the frame measurement satisfies at least one fit condition. A fit rule may comprise comparing a frame measurement with a threshold value. Alternatively or in addition, a fit rule may comprise comparing a frame measurement with a facial measurement. The fit rules can therefore be used to determine by how much the at least one frame measurement needs to be adjusted. Using fit rules to help adjust the frame measurement provides a more accurate method of adjusting the spectacle frame compared to manually adjusting the frame measurement. The fit rule ensures that the frame is adjusted until the position of the lens relative to the pupil is correct and reduces the chance of incorrect frame adjustments being made.

Preferably, the adjusting step comprises applying a plurality of fit rules to the frame measurement and adjusting the frame measurement such that the frame measurement satisfies a plurality of fit conditions. Using multiple fit rules to help adjust the frame measurement further increases the accuracy with which the spectacle frame is adjusted. Different fit rules may apply to different frame measurements. This may help ensure that different aspects of the frame, corresponding to the different frame measurements, are adjusted to help ensure that the position of the lens relative to the pupil is correct for the user. More than one fit rule may apply to a frame measurement. This may help ensure that the frame measurement has been adjusted correctly for the user such that the position of the lens relative to the pupil is optimal for the user.

In some examples, the plurality of fit rules may correspond to a nose region, an ear region, a facial dimension region, and/or a lens region. The plurality of fit rules may comprise some or all of the aforementioned regions. In some examples, the plurality of fit rules may comprise alternative and/or additional regions. When in use, a spectacle frame comes into contact with parts of the user's face at a number of key locations where the spectacle frame is supported by the facial features.

These regions include the ears and the nose. It is therefore important that the spectacles are sized correctly for each user around these key regions so that the spectacle frame sits correctly on the user's face. By this we mean that that spectacle frame is sitting correctly when the position of the lens relative to the user's eye provides maximum visual correction for that user, based on their prescription. Thus, having a number of fit rules relating to these key regions helps ensure that the spectacle frame is accurately sized to each user at these key regions, providing a better fitting spectacle frame.

According to second aspect there is provided a computer system configured to adjust a spectacle frame for a user to provide a customised spectacle frame, comprising: a receiving module configured to receive input data comprising three-dimensional coordinate data representing a user's head; a processor configured to: identify a plurality of landmark locations within the input data, wherein a landmark location corresponds to a three-dimensional position of a facial feature; determine a set of facial measurements based on the plurality of landmarks locations by calculating at least one measurement associated with at least one landmark location using the landmark locations; a retrieving module configured to retrieve a set of frame measurements representing a base spectacle frame from a database of frame measurements; the processor further configured to: compare the set of facial measurements with the set of frame measurements; adjust at least of frame measurement in the set of frame measurements based on the comparison; output a data file comprising a set of adjusted frame measurements; wherein the set of frame measurements comprises a lens height measurement and the adjusting comprises adjusting the lens height measurement from an initial value to an adjusted value.

Preferably, the computer system may further comprise a scanning module configured to scan a user's head and generate input data. The scanning module may be further configured to send the input data to the receiving module. Including a scanning module as part of the computer system helps provide a complete, self-contained computer system for adjusting a spectacle frame.

In some examples, the scanning system comprises a camera and a signal emitter. The signal emitter may be configured to emit a plurality of signals at the user's head and the camera may be configured to detect the emitted signals. This provides an accurate method of detecting a user's head and taking an image of the user's head, the image being converted into a 3D representation, in the form of 3D coordinate data, of the user's head. Emitting a plurality of signals ensures that substantially the whole of the structure of the user's head is captured.

Preferably, the signal emitter comprises an infrared emitter and the camera comprises an infrared camera. Infrared image capture provides a convenient and accurate method of acquiring 3D coordinate data of an object.

In other examples, the scanning module comprises a LiDAR camera. This provides an alternative convenient and accurate method of acquiring 3D coordinate data of an object.

According to a third aspect there is provided a computer program comprising instructions which, when executed by a computer, cause the computer to carry out the above described method and any of its variations.

According to a fourth aspect there is provided a computer-readable data carrier having stored thereon the above described computer program.

According to a fifth aspect there is provided a computer-implemented method of processing image data to estimate a location of a facial feature, comprising the steps of: receiving input image data comprising three-dimensional coordinate data representing a user's head; pre-processing the input image data to produce a pre-processed input data set; inputting the pre-processed data set into a first neural network and outputting a first result, wherein the first result comprises three-dimensional coordinate data representing a first estimate of the location of a facial feature; processing the first result to produce a processed input data set; inputting the processed input data set into a second neural network and outputting a second result, wherein the second result comprises three-dimensional coordinate data representing a second estimate of the location of the facial feature, and wherein the second result is different from the first result.

The method may therefore comprise the sequential use of two neural networks. The first and second neural networks may be the same or different types of neural network.

Accurately identifying the location (position) of facial landmarks is important because a number of these facial landmarks are particularly significant in ensuring that the spectacles frame sits correctly on the users face, so that the lenses are held correctly in front of the pupils. The above described computer-implemented method, which makes use of machine learning, is advantageously able to more accurately estimate a facial landmark position from input images, as a result of improved classification accuracy of the overall algorithm.

Accurate determination of the facial landmarks allows a more accurate representation of the structure of the face to be created which allows more accurate prediction of how the lens will be held in the frame in relation to the wearer's pupils. If the prediction indicates that optical correction for the wearer is suboptimal, then suitable adjustments can be made to the frame to adjust the lens height measurement such that the lens is repositioned to align with the pupil centre at the correct tilt and vertex distance.

The pre-processing may comprise: sampling the input image data to produce a first sampled dataset; and reducing the dimensionality of the first sampled dataset, to produce a first reduced dataset. The input image data may further comprise a colour texture map and the sampling may comprise sampling a position and colour of the input image data. Reducing the dimensionality of the sampled dataset may mean that the overall size of the dataset is reduced. The first reduced dataset may comprise three-dimensional coordinate data.

The processing may comprise: sampling the first result to produce a second sampled dataset; and reducing the dimensionality of the second sampled dataset, to produce a second reduced dataset. The sampling may comprise sampling the position and colour of the first result;

The facial feature may comprise an ear. The facial feature may comprise a pupil.

The computer-implemented method of processing image data to estimate a location of a facial feature (the fifth aspect) may be used in combination with the method of the first aspect of adjusting a spectacle frame for a user to provide a customised spectacle frame, and any of its variations. In particular, the computer-implemented method of processing image data to estimate a location of a facial feature may form at least part of the "identifying" step of the method of adjusting a spectacle frame for a user to provide a customised spectacle frame.

The computer-implemented method of processing image data to estimate a location of a facial feature (the fifth aspect) may be used in combination with the computer system of the second aspect which is configured to adjust a spectacle frame for a user to provide a customised spectacle frame, and any of its variations. In particular, the processor of the computer system may be configured to carry out the computer-implemented method of processing image data to estimate a location of a facial feature when the processor is configured to carry out the "identifying" step.

According to a sixth aspect there may be provided a method of training a classifier for locating a facial feature using image data, the method comprising: generating a first training dataset wherein the first training dataset comprises a plurality of head scan images; training the first neural network using the first training dataset, the training comprising the steps of: selecting a first subset of the first training dataset and using this subset to train the first neural network; determining the accuracy of the first neural network using a second subset of the first training data set, wherein the second subset of the first training dataset comprises the head scan images that do not form part of the first subset; iteratively training the first neural network using the first training dataset; and ending the training of the first neural network when the observed difference between the output of successive iterations is less than a first threshold value; outputting the result of the first neural network, wherein the output represents a first estimate of the location of the facial feature comprising three-dimensional coordinates and colour texture data of the first estimate of the location of the facial feature. The method may further comprise: generating a second training dataset, wherein the second training dataset comprises a selected portion of each head scan image from the first training dataset, the selected portion centered on the three-dimensional coordinates of the first estimate of the location of the facial feature; training the second neural network using the second training dataset, this training comprising the steps of: calculating a set of residuals representing the error of the first neural network; selecting a first subset of the second training dataset and using this subset to train the second neural network; determining the accuracy of the second neural network using a second subset of the second training data set, wherein the second subset of the second training dataset comprises the data that does not form part of the first subset; iteratively training the second neural network using the second training dataset; and ending the training of the second neural network when the observed difference between the output of successive iterations is less than a second threshold value; outputting the result of the second neural network, wherein the output represents a second estimate of the location of the facial feature comprising three-dimensional coordinates and colour texture data of the second estimate of the location of the facial feature.

The first training dataset may generated by observing facial location marking carried out manually and annotating the plurality of facial scans with the three-dimensional position coordinates and colour texture map values of the facial feature.

For the avoidance of doubt, any of the above described aspects and their variations can be combined with any one or more other described aspect and their variations.

BRIEF DESCRIPTION OF DRAWINGS

Embodiments of the present invention will now be described by way of example only, with reference to the accompanying drawings, in which:

FIG. 1 shows a fit engine API workflow;

FIG. 9 shows further examples of frame measurements;

FIG. 13 shows further examples of frame measurements;

FIG. 14 shows further examples of frame measurements;

DETAILED DESCRIPTION

Figure 1A:
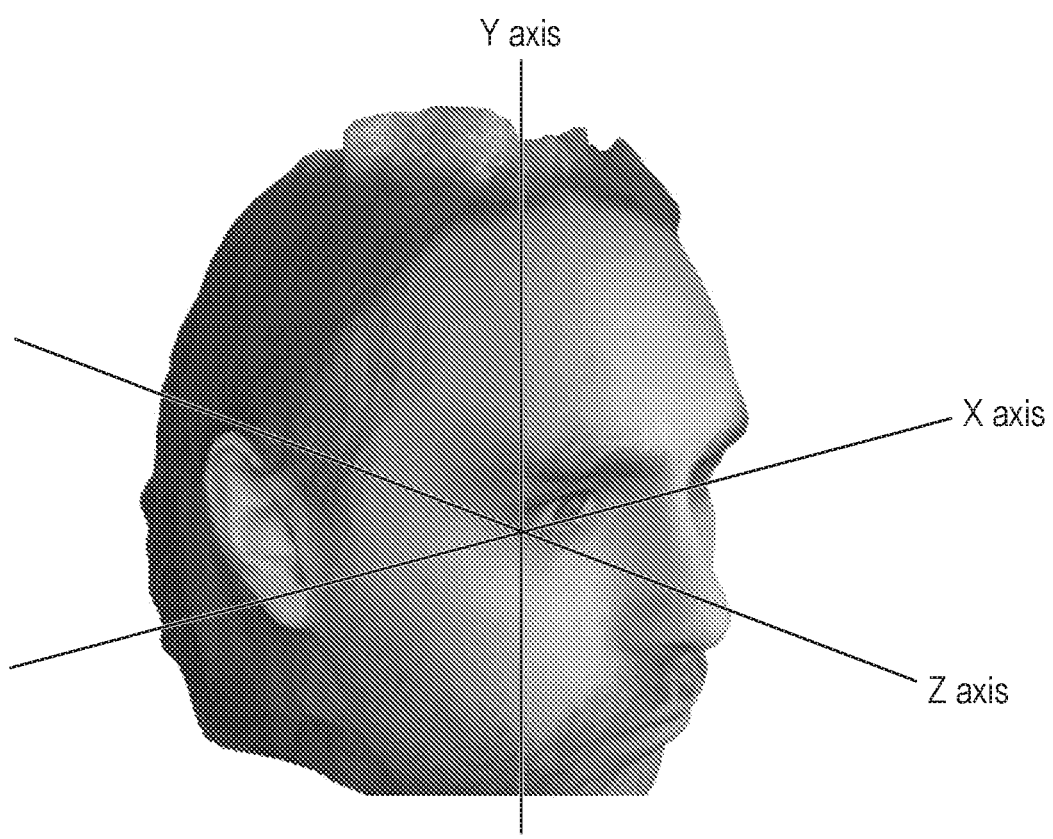
FIG. 1a shows a xyz coordinate system relative to a person's head, based on the Cartesian coordinate system.

In order to determine how a spectacle frame will sit on a wearer's nose, knowledge of the shape of the nasal bridge and the shape of the frame bridge is required in order to predict the frame sit position on a wearer's face.

The present invention relates to a fit model which is able to provide an accurate prediction of the frame sit position, based on information and data acquired about the frame and the wearer's face, in order to provide the ability to identify how the wearer's pupil will interact with the lens when the frame is worn. This prediction can then be used to help provide the wearer with a well-fitting pair of glasses.

In order to provide a well-fitting pair of glasses (also referred to as spectacles), a standard glasses frame can be adjusted in size and shape so that they are more specific to the wearer, resulting in a better fit. In particular certain frame parameters can be adjusted based on measurements of a wearer's head to provide a pair of glasses that are more suitably sized to the wearer's head. By better fitting we mean that the lens position in relation to the wearer's eye is optimised, through adjustment of the frame which holds the lens, so that placement of the glasses frame on the wearer's head provides optimal visual correction. When the spectacle lens is correctly placed relative to the pupil, the optical axis will substantially coincide with the visual axis of the wearer. This is important as it means that there will be minimal prismatic effect experienced by the wearer when viewing objects through the lens.

To provide a tailored pair of glasses accurate measurements of the facial features of a subject must be made, along with accurate measurements of the components of a spectacle frame. These measurements can be converted into input data which is used to describe, mathematically, a person's head and a spectacle frame. This input data is analysed, as will be described in more detail below, allowing any necessary adjustments to the frame to be made.

The spectacle frame is tailored using a fit model comprising a set of fit rules, or fit algorithms, which are used to adjust different aspects of the spectacle frame. The different aspects of the spectacle frame correspond to different frame measurements, which will be discussed in more detail below. In particular, the fit model focuses on four main areas, namely the nose, the ears, facial dimensions, and the lens. Each of these areas is associated with at least one fit condition, and in some cases a plurality of fit conditions, which need to be satisfied in order for the frame to be considered as appropriately sized for a particular wearer. The fit conditions associated with each area and the algorithms which make use of these fit conditions through application of the fit rules are therefore used to adjust the frame measurements to provide a customised frame.

In general, in order to adjust parameters of a spectacle frame, a wearer's head is first scanned using a scanning module in order to generate a three-dimensional (3D) scan of the wearer's head. The scanned data is output as a 3D data file comprising three-dimensional coordinate data representing the wearer's head. Optionally a depth map and/or a texture map may also be output. The 3D data file comprising the three-dimensional coordinate data forms the set of input data which is sent to a processing module. The processing module analyses the input data of the 3D scan and identifies at least one facial landmark within the 3D scan. A landmark, or landmark location corresponds to a three-dimensional position of a facial feature. The landmark locations are then used to determine a set of facial measurements by calculating a measurement associated with the landmark locations. In some cases, calculating a measurement comprises calculating a distance between two landmark locations. In other cases, calculating a measurement comprises calculating an angle formed between two landmark locations and/or an angle formed between a landmark location and a coordinate axis or plane. The set of facial measurements will typically comprise a combination of the above-described calculations. Thus, measuring the facial landmark, based on the input data of the 3D scan, can be used to determine the dimensions (for example the size and shape) of the facial landmark. An acquiring module retrieves at least one frame measurement from a database of stored frame measurements. The database of stored measurements corresponds to standardised frame sizes of a particular part of the frame. The frame measurements are associated with at least one facial landmark. For example, the width of the spectacle frame is associated with the distance between the wearer's eyes. The acquired frame measurement represents an initial spectacle frame, or a base spectacle frame, which is then adjusted and tailored using the fit model and applying the fit rules. This step can comprise comparing a facial measurement to a frame measurement to determine any adjustments in the size or configuration of the base frame that need to be made in order to satisfy the fit conditions. A fit condition is satisfied when the frame measurement is within a threshold limit of the landmark measurement.

The fit model rules are used to provide a recommended set of frame measurements which is best suited to provide an optimal lens position in relation to the eye when the wearer is wearing the spectacles. Frame measurements which satisfy the fit conditions for all four main areas of the fit model are determined to be optimal for a particular user.

Further details of the fit model will now be described. It should be noted that references to the x-axis refer to the left-right (i.e. horizontal or transverse) direction relative to the user, references to the y-axis refer to the up-down (i.e. vertical or longitudinal) direction relative to the user, and references to the z-direction refer to the forward-backward (i.e. axial or depth) direction relative to the user, as illustrated in FIG. 1a.

FIG. 1 illustrates the overall workflow of a fit engine API. The fit engine API can be implemented in a computing system 100 for example a desktop computer or a mobile computing device. The fit engine API may also be implemented in a cloud-based system. A user wishing to have a frame adjusted to their head first uploads their spectacles prescription S102 through interaction with a user interface provided in the computing system. In order to provide a tailored frame for the user, the computing system needs to compare facial measurements with frame measurements, and then make suitable adjustments to the frame measurements based on the facial measurements and fit rules.

Facial measurements are a set of measurements related to the wearer's face and are taken on the face only. Frame measurements are a set of measurements which relate to features of the frame and are taken on the frame only. In addition to these sets of facial measurements and frame measurements, an additional set of face-frame measurements is taken. These face-frame measurements are made on both the frame and the face and relate directly to each other. Finally, a set of side measurements is made, comprising facial and frame measurements which relate to the frame sides and their adjustment. These different sets of measurements form the data to which the fit rules are applied and a tailored spectacle frame is produced. Details of the measurements within each of these sets and how they are acquired will now be described.

Figure 2:
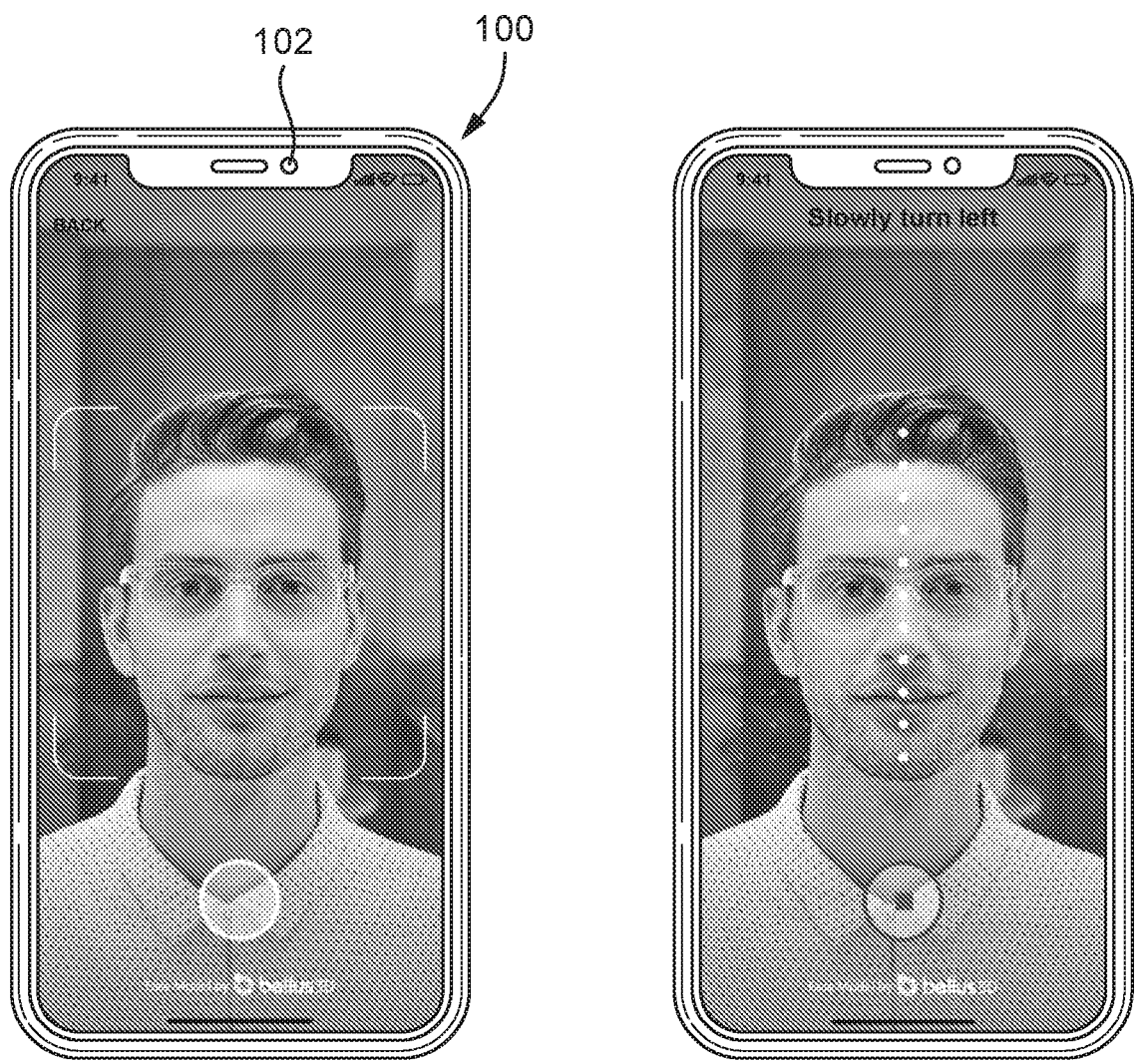
FIG. 2 shows an example of scanning module on a computing device.

Facial measurements of the wearer are acquired using a scanning module 102, which takes the form of a scanner. The scanning module 102 may be part of the computing system 100, for example the scanning module 102 may comprise a camera 102 in a mobile computing device as shown in FIG. 2. Alternatively, the scanning module may be a separate component which is in communication with the computing system, for example a standalone head scanner. The user scans S104 their head using the scanning module 102 in order to capture data related to the user's head from which facial measurements can be made.

In order to ensure the whole of the user's head is scanned, the scanning module 102 needs to capture the user's head from a plurality of angles to ensure facial data is obtained for the whole of the user's face. In some cases the scanning module may be arranged to move around the user's head which remains in a fixed position, for example by tracing a horizontal arc around the user's head from one side of the face, across the front of the user's face, and to the other side of the face. In other examples the user may rotate their head from one side to the other side while the scanning module 102 remains stationary. This latter example is illustrated in FIG. 2. In this example, the scanning module 102 is in the form of a camera on a mobile device and the user is presented with a plurality of commands via a display screen on the mobile device, for example "Slowly turn left", instructing the user to move their head from side-to-side so that a 3D mesh of the user's face is created, comprised of thousands of individual infrared points. By overlaying a high-resolution scan, it created an accurate and photo realistic 3D model of the user's face. The scanning module 102 accurately records the user's head in a 3D scan.

The scanning module 102 comprises a camera and a signal emitter which is configured to emit a plurality of signals at the user's face which has been detected by the camera. The emitted signals are used to build up a mathematical picture of the user's face.

In some examples, the scanning module 102 takes the form of a TrueDepth® camera comprising an infrared emitter. The infrared emitter projects numerous infrared dots in a known pattern onto the user's face. An infrared camera then captures an image of the infrared dots and creates a 3D model of the user's head. In other examples, the scanning module 102 takes the form of a LiDAR camera which uses multiple timed laser pulses to build a 3D model of the user's head.

The 3D scan data is then input into a facial mapping machine learning algorithm which identifies and records certain positions known as landmarks across the head S106. The machine learning algorithm has previously been trained to identify known facial landmarks from facial scan data. More specifically, landmark positions are positions of prominent facial features. Positions of the landmarks can be recorded as coordinates, for example xyz-coordinates taken from the 3D scan data. Examples of facial landmarks include the location of the centre of each pupil, the location of the tip of the nose, and the location of the ears.

Some facial landmarks may be considered as relatively more important than other facial landmarks, for example the position of the ears and the position of the pupils are more important than the position of the tip of the nose. This is because the arms of the spectacles frame rest on the ears (in particular, the bend in the frame arms rests on top of the ears) and the lenses must be positioned in front of the pupils, in order for the spectacles frame to sit correctly on wearer's face such that the frame holds the lenses in optimal alignment with the wearers pupils. Further details regarding identifying the position of the ears and pupils will now be discussed.

Considering firstly the location of the ears, a problem with estimating the ear landmark positions based on the average ear location as measured manually on a set of head scans is that the resulting landmark location is generally inaccurate due to the impact of hair or other impediments such as occlusion, and difficulties in trying to estimate positions behind the ear with a scan that covers 180 degrees.

In order to solve the technical challenge of how to accurately and consistently identify the ear landmark point, taking into account the problems of hair and occlusion, the ML algorithm is trained on specific variables using specific data.

The following description refers to first and second neural networks. The first neural network produces an output that, once processed as described below, serves as input for a second neural network. The second neural network can produce a highly accurate estimate of the position of a relevant structure such as the left and/or right ear, or a landmark point/points corresponding to the left and/or right ear, using this input. Additionally, certain pre-processing steps are also performed. It has been found that these steps unexpectedly improve the classification accuracy of the overall algorithm—i.e. the algorithm as described herein is advantageously able to more accurately estimate the landmark position (for example the ear landmark position) from input images.

Figure 19:
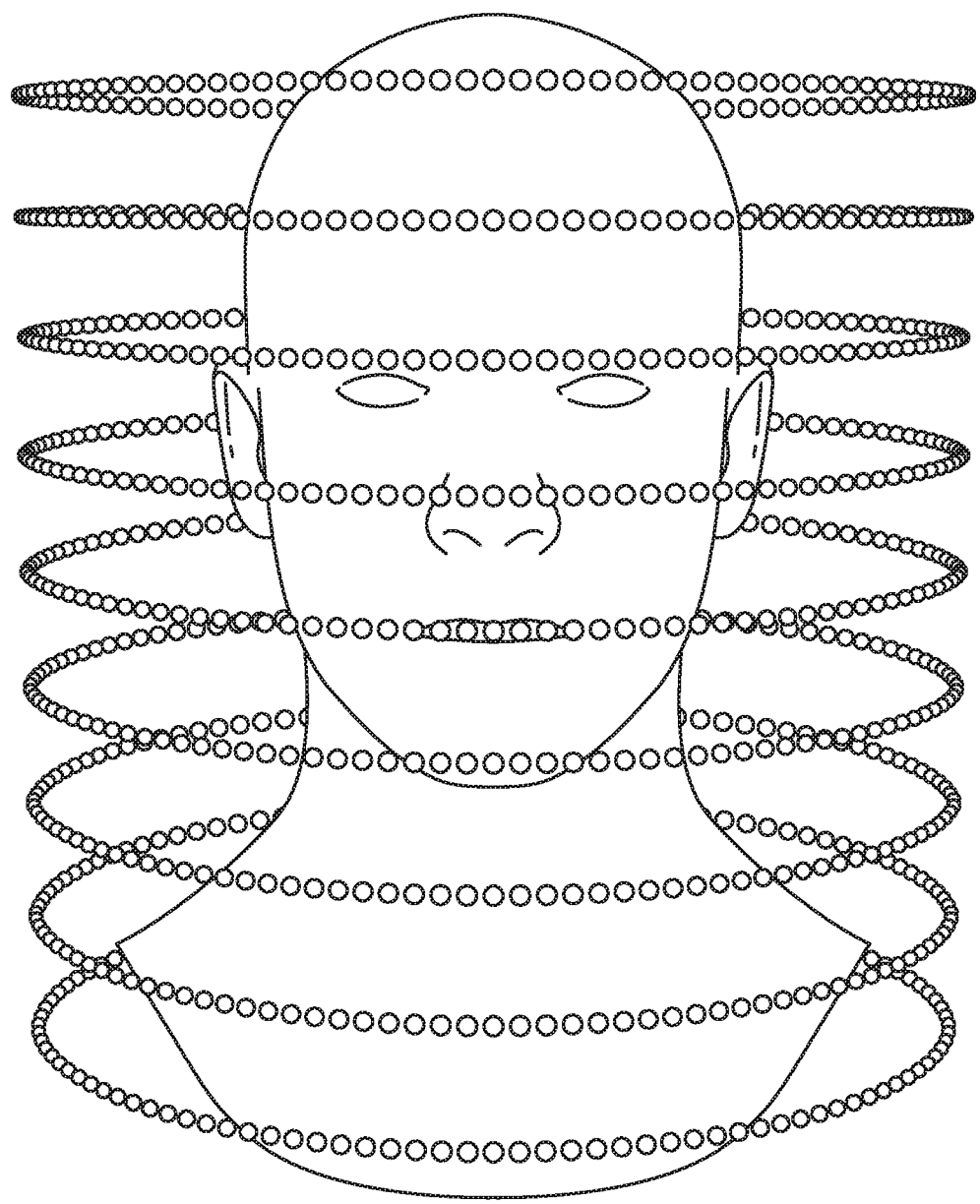
FIG. 19 shows an example sampling process, in a cylindrical pattern.

Firstly, the 3D scan data (image data) is pre-processed before being input into the first neural network. This pre-processing includes sampling the position and colour of the 3D scan data in a cylindrical pattern, as shown in FIG. 19. A patch sampling process, centred on an initial target landmark location point which has been (for example, manually) estimated, is then carried on the cylindrically sampled position and colour data from the 3D scan data. The data derived from the patch sampling process is reduced in dimensionality using an orthogonal basis vector set. The orthogonal basis set of 15 vectors is derived during training from a set of, for example, 3000 patches obtained from sample head scans (the number of patches could vary, e.g. between 1000 and 5000, or 500 and 10000). The reduction in dimensionality makes it feasible to train the system to a useful level of performance with comparatively few training examples.

The input variables to the first neural network are biased according to their mean value in the training data set. Following this bias step, the bias-corrected data is then weighted according to the reciprocal square root of the variance observed in the variables for the training data set. The biases are selected using the average of the input data, and the normalisation by the variance. This selection of biases means that less information has to be learned by the neural network, which reduces the depth of the network and reduces the overall number of training iterations required to train the network.

The pre-processing steps help improve the accuracy of the output for a given volume of training data, by helping the neural network with our prior knowledge of the likely location of the landmark position (such as the position of the ears), and also by reducing the dimensionality of the data to make the training process more tractable with low volumes of annotated head scans.

The first neural network operates on the reduced dimensionality representations of the patches of position and colour data, which form part of the input variables. The coefficients of the neural network are adjusted to fit the measured intended ear point results for a set of pre-existing head scans. The neural network model used is preferably a multilayer perceptron composed of a combination of rectified linear units, concatenated rectified linear units and Gaussian units. An initial estimate of the ear landmark location is obtained as the output, in the form of 3D-coordinates.

Once the output from the first neural network is obtained, the patch sampling step is repeated, centred on the position estimate obtained from the first neural network, and the result is input into a second, different neural network that has been trained specifically to improve the output from the first neural network. Information on the training process is set out later in this specification. The second neural network outputs three dimensional coordinates of the landmark point for example the left and/or right ear landmark point(s). It will be appreciate that the first neural network has coarsely located the coordinates of the landmark point(s), such that the second neural network is operating on a subset of the total image data that is highly likely to contain the landmark point(s). This advantageously improves the final location of the landmark(s).

Advantageously, the use of two neural networks one after the other as described above allows hyperparameters for the two neural networks to be optimised independently of one another. This can improve the accuracy of the overall landmark detection process. In addition, as noted above, the second neural network to operate on a subset of the data that is known to contain the ear landmark(s) owing to the first pass performed by the first neural network. This allows the application of the domain knowledge that people have left and right ears which will be in locations given approximately by the initial neural network to gain efficacy in training and implementation.

Having described the landmark detection process using the first and second neural networks, a discussion is now provided in relation to the training of these neural networks.

The training data used to train the first neural network is a set of head scans. This is referred to herein as the first training dataset. Each head scan is essentially an image of the head of a particular person and is of the type discussed above. A suitable number of head scans will be selectable by a person of skill in the art having regard to this disclosure. Typically several thousand (for example 1000 to 5000, or about 3000) head scans will suffice. The invention is however not limited to use of any particular number of head scans in the first training dataset. Each head scan preferably includes geometry data (for example in the form of polygonal mesh data), normal vectors at multiple points within the geometry data (or on the mesh when this is relevant), texture map coordinates, and a colour texture map (e.g. an RGB texture map). Each head scan is annotated with three dimensional left and right ear positions, e.g. marked using a methodology aligned with observations of trained optical dispensing staff.

In a preferred embodiment, the first training dataset is generated by observing ear point marking in practice during optical dispensing and annotating the set of (e.g. 3000) head scans in three dimensions with the location of left and right ear points corresponding to this methodology.

The first neural network is trained using a portion of the first training dataset. Once trained, the remaining part of the first training dataset is used to gauge the accuracy of the first neural network. This process is repeated iteratively until the first neural network is deemed to be producing sufficiently accurate results. That is, the training phase of the first neural network is ended when the observed difference between successive optimisation iterations is less than a threshold value. The threshold value will be selected by a person skilled in the art having regard to the specifics of the situation at hand. As an example, the threshold can be set in the region of, or at, 100 microns root mean square (RMS) error in the average error across the six three dimensional coordinates (i.e. left and right ear X coordinate, Y coordinate and Z coordinate). The invention is however not limited to this value as the threshold could instead be set to other values, e.g. a value in the range 50 to 500 microns.

Figure 20:
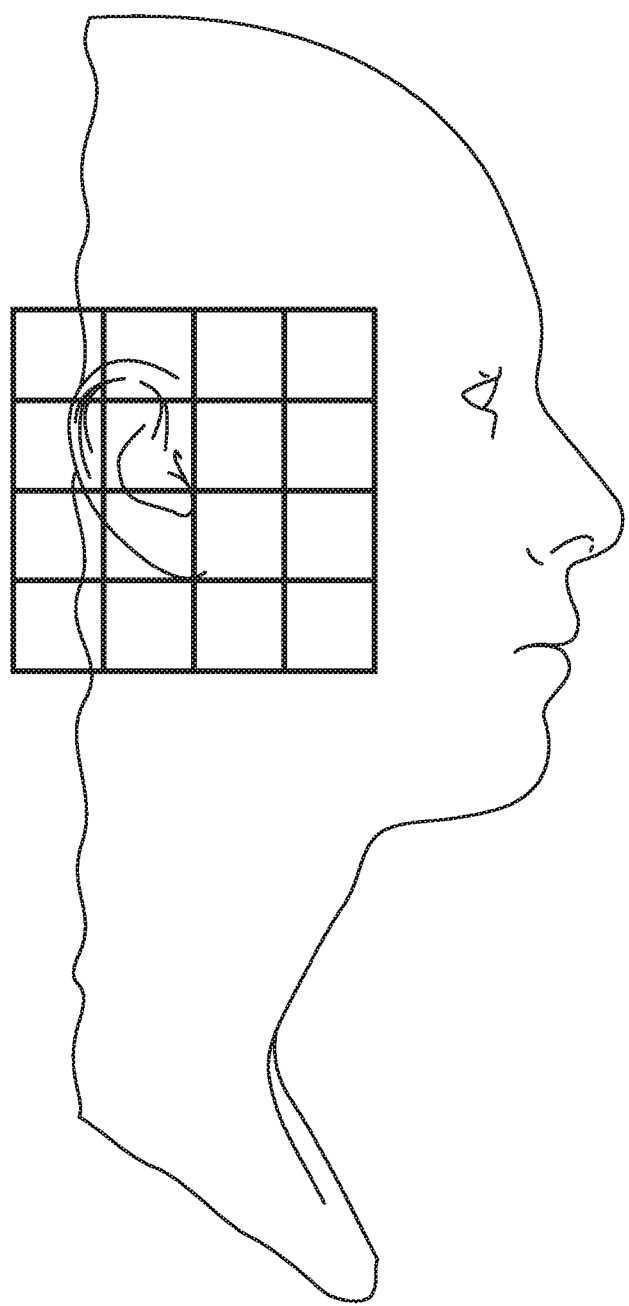
FIG. 20 shows an example of a subset of input data.

Once the first neural network is trained, results from the training process are used to generate a second training dataset for training the second neural network. The second neural network is trained by only using data that is close to the landmark feature in question (for example the three-dimensional position coordinates are within a certain range of the initial estimates of the landmark position outputted by the first neural network). In other words, the second neural network is not trained using the entire head scan data set, but is instead trained using a subset of this data which is particularly relevant to the landmark in question. For example, a subset of the data input (e.g. a 16 by 16 grid (i.e. 256 samples) as shown in FIG. 20) centered around the left and right initial estimates (the estimates being derived from the average location of the left and right ears taken across all the head scans in the training dataset), together with the three dimensional coordinates representing the location of the left and right initial estimates, together with the subset of the texture data around the initial left and right estimates, form the second training data set used to train the second neural network. The second neural network is then trained as described above in respect of the first neural network, but using the second training dataset.

During the training of the second neural network a set of residuals may calculated representing the error of the first neural network. In some cases, the residuals may be used to govern the size of the data subset (i.e. the selected portion of the image). For example, if the first neural network outputs an estimate of an ear landmark location as being at coordinates X plus/minus 1%, then the second neural network can use a subset of the total image that comprises coordinate location X plus/minus 1% as the training dataset for the second neural network.

Alternatively, the second neural network may be trained using the residuals of the first neural network as an input parameter. In this case, the second neural network may use the residual as part of its classification so the residual is an input into the second neural network.

It has been found that the sequential training of the first and second neural networks in this manner can result in a particularly accurate landmark detection process.

Considering now the location of the pupils, a problem with estimating the eye location based on the average location as measured manually on a set of head scans is that this method does not provide an accurate estimate of the location of the pupil, due to difficulties in the scanning process. In particular because the scan isn't able to detect a hard surface of the eye because of the "hole" created by the pupil, the scan takes the centre point between the outer canthus of the eye (lateral and medial) as the location of the pupil. However this location does not always equate to the correct pupil location and as there is often variation between the relative pupil positioning in each eye.

In order to solve the technical challenge of how to accurately and consistently identify the landmark points (i.e. location) of both pupils, the invention finds the darkest region in the eye and sets the centre of this region as the centre of the pupil. This process is as follows.

As a starting point, the position of each eye is set to the average location as identified from a manual measurement on a set of head scans. This gives an approximate location for the pupil that is refined by the invention.

Following this, the position and colour of the 3D facial scan is sampled in a rectangular pattern centred at the estimated position of each eye in turn. As before, patch sampling is then carried out in order to reduce the sampled position and colour data in dimensionality using the initial eye location estimates as a basis.

As before, a neural network operates on the reduced dimensionality representations of the patches of position and colour data. The coefficients of the neural networks are adjusted to fit the measured intended pupil point results for a set of pre-existing head scans. Similarly to the ear landmark determination, once the output is obtained, the patch sampling step is repeated using a different neural network that has been trained specifically to improve the output from the first neural network. The output of the final neural network is the three dimensional coordinates of the left and right pupil points.

It will be appreciated that the techniques described above for locating ears and eyes can be applied to other facial features, e.g. the nose, mouth, eyebrows, lips, etc.

Figure 3:
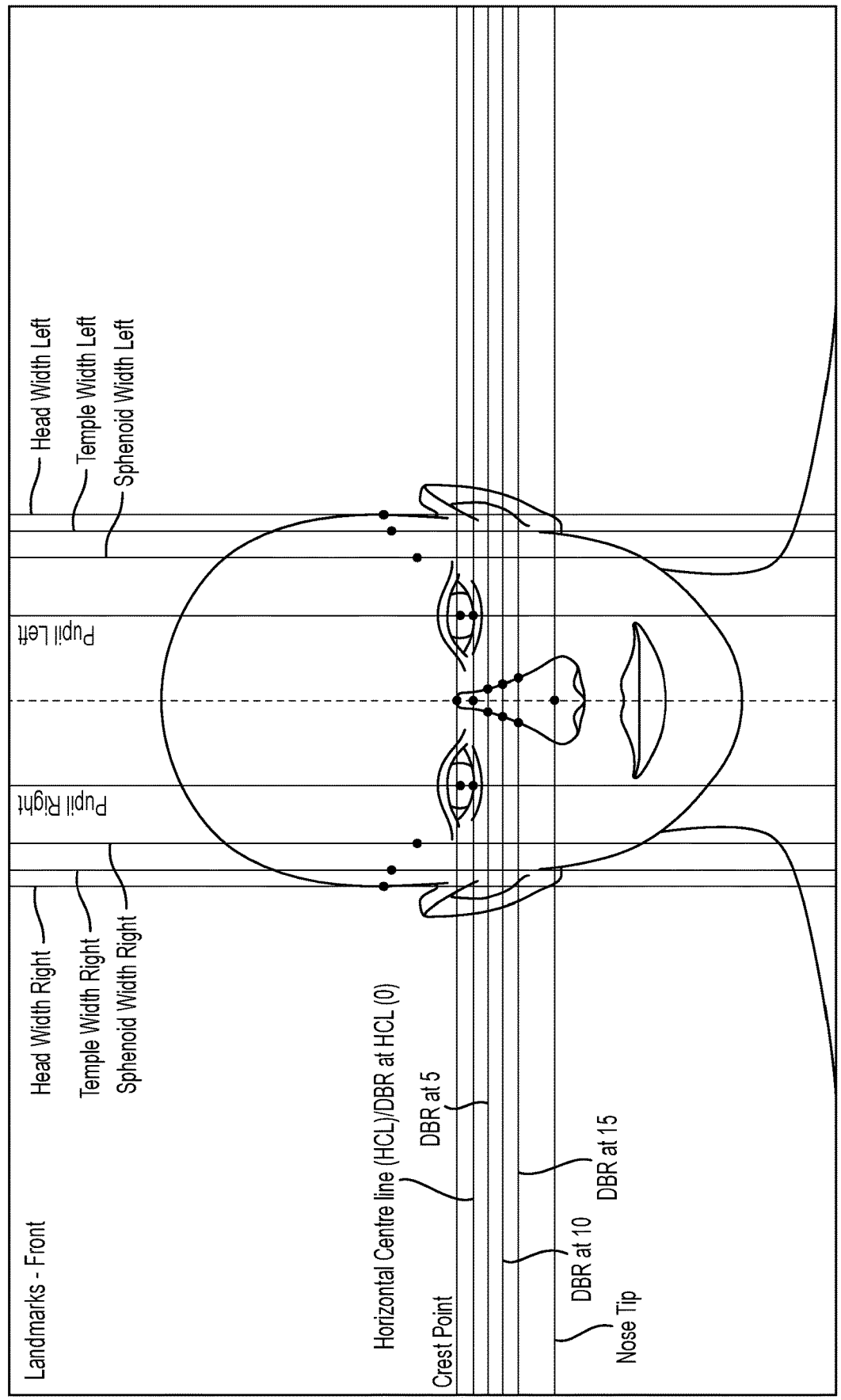
FIG. 3 shows examples of facial landmarks on the front of the face.
Figure 4:
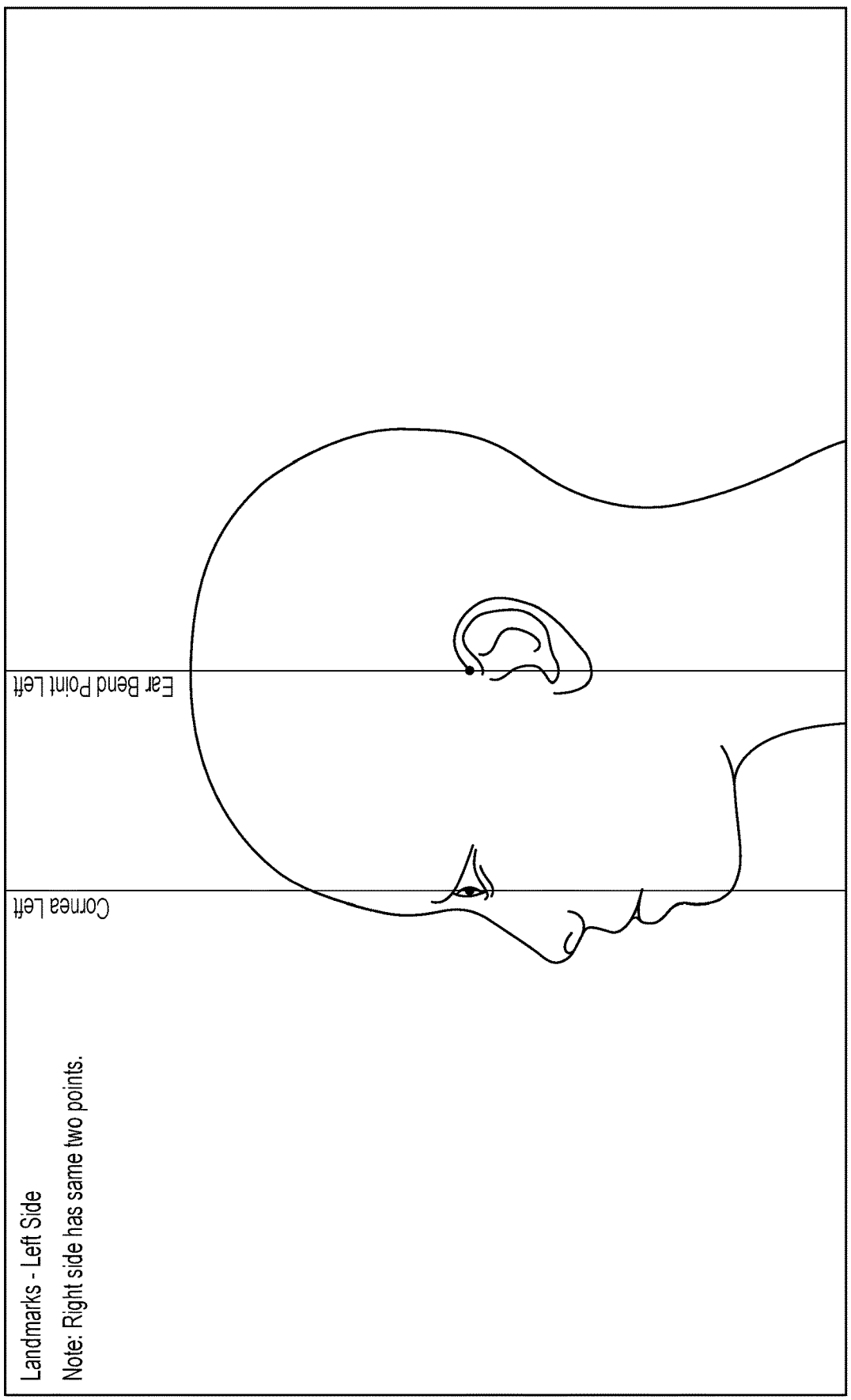
FIG. 4 shows examples of facial landmarks on the left side of the face.

FIGS. 3 and 4 illustrate facial landmarks on the front and side of the head respectively. As will be appreciated, the landmarks on the right side of the head will be the same as those on the left side of the head shown in FIG. 4.

Once the landmarks have been identified and their corresponding positions recorded in a dataset of landmark coordinates, ray casting is applied to the landmark dataset in order to extract further information about the geometry of the face. This further information provides additional details regarding how the different facial landmarks relate to each other, as well as providing details about the size and shape of a particular facial feature. For example, ray casting can be used to determine the shape of the nose based on nasal landmark data points, and the distance between pupils as well as the shape of the eye based on eye landmark data points. Determining information about the geometry of the face is important as it is this information which is used to build, or construct, a virtual image of the individual's head which will then be used to adjust a pair of spectacles. In this context a virtual image is a mathematical construct, and comprises a database of data points representing all the different locations and related measurements that represent an individual's head.

Determining the locations of the facial landmarks is important as it is from this facial data that measurements of a wearer's head are determined, which will be used to adjust the frame measurements. Facial data acquired from the 3D scan must be interpreted correctly so that accurate data relating to a wearer's facial features are input into the fit model.

A key element of the facial data, from a fitting perspective, is the nose. Since the nose is the facial structure on which the main body of the frame rests, it may be considered as one of the most important facial structures with respect to the correct positioning and fitting of a spectacle frame. The relationship between the frame and the nose will greatly determine whether the frame will fit correctly on a wearer's face and provide sufficient visual acuity so that the wearer's vision is improved through use of the spectacles. However, the structure of the nose can vary greatly between individuals and so a number of variables need to be taken into account in order to ensure that the glasses frame rests on the bridge of the nose in a manner which ensures that the lenses are correctly positioned relative to the pupils. In particular, the bridge of the nose, defined as the elevation formed by the nasal bones themselves, and the angle of the nose can vary greatly, and since the nasal bridge is the area where the spectacles bridge should rest on the nose, accurate representation of this area is important. The crest of the nose can also take a variety of different shapes, for example it may be straight, concave, convex, or display a wave like configuration, and so these variations should be taken into account. Finally, the relative levels of the eyes and the bridge of the nose are integral when fitting a spectacle frame because it will have an effect on whether the centre of the lens is correctly aligned with the pupil. The relationship between the eyes and the nasal bridge needs to be accurately determined in order that the position of the lens can be suitably adjusted.

Figure 5:
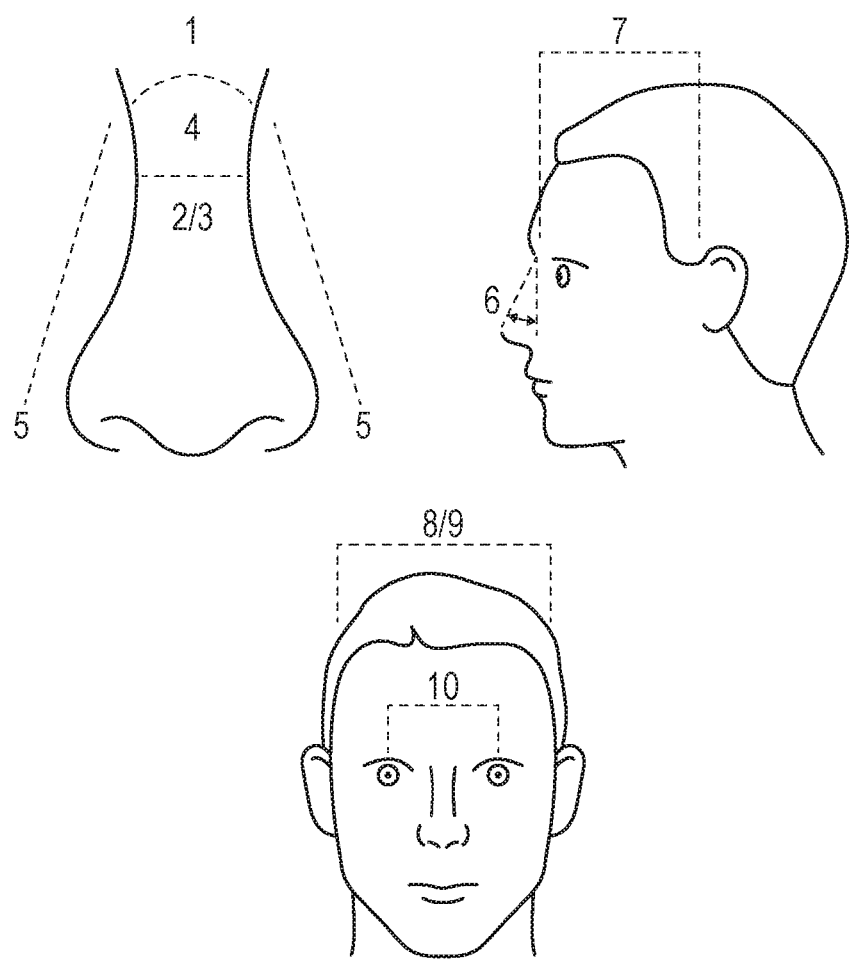
FIG. 5 shows examples of facial measurements.
Figure 6:
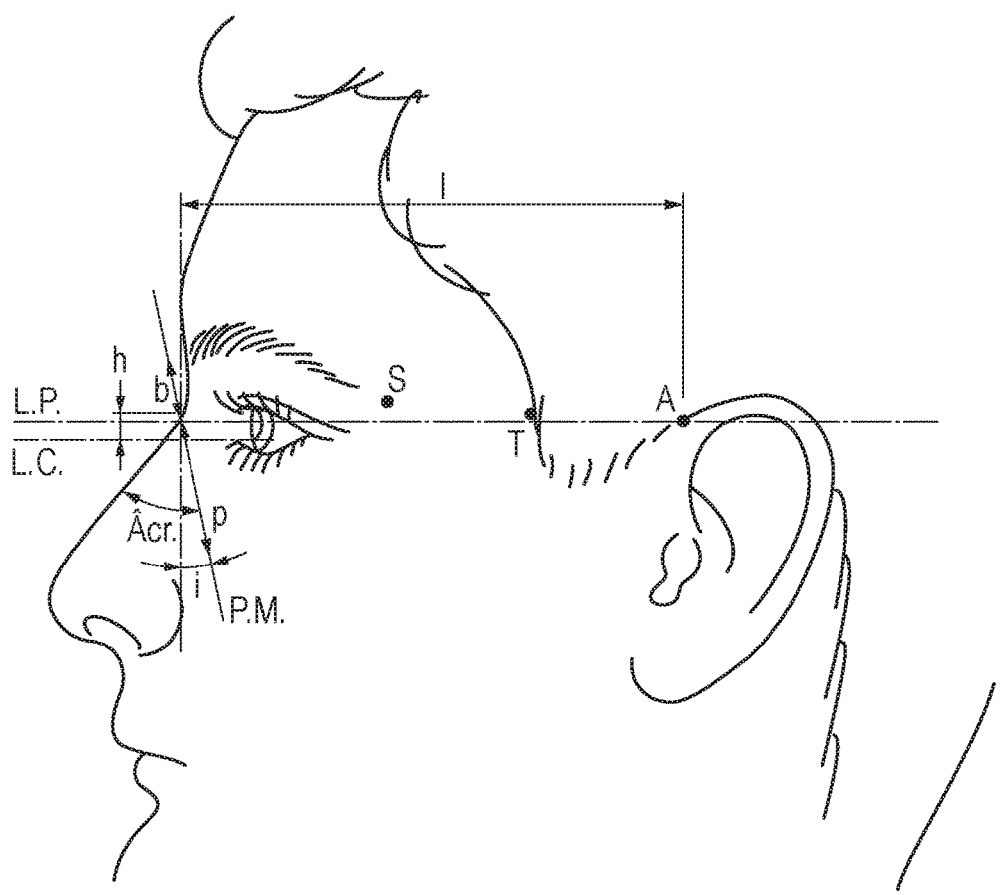
FIG. 6 shows further examples of facial measurements.
Figure 7:
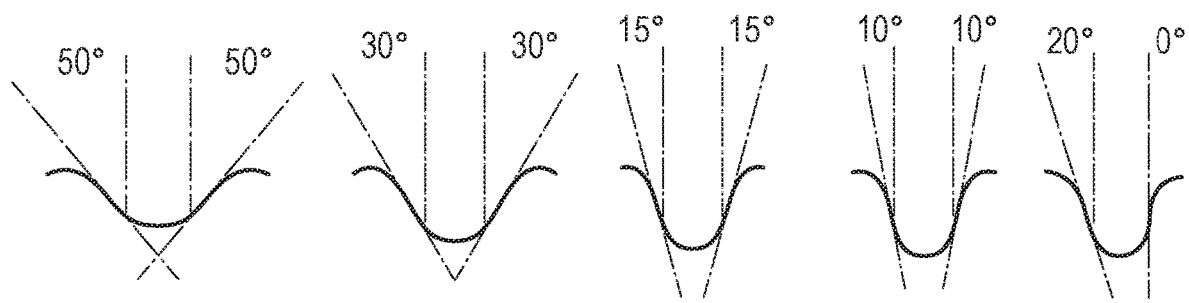
FIG. 7 shows further examples of facial measurements.

The locations of the landmarks can be used to calculate a set of facial measurements S108 to be input into the fit model, which will determine the correct position of the frame on the nose, and therefore the correction position of the lenses relative to the pupils. FIGS. 5, 6, and 7 illustrate some of the different facial measurements relating to the nose landmark that can be determined from the 3D head scan.

Turning first to FIG. 5, the facial measurements in relation to the shape of the nose are of particular importance. In particular, the following facial measurements are determined, wherein the number of the facial measurements corresponds to the reference numeral of the measurement in FIG. 5:

Ref 4 in FIG. 5—Nasal crest height, corresponding to the vertical height in the y-direction where the nose starts ('crest'). This measurement can be thought of as where the nose starts relative to the bottom of the eye (the lower eyelid). The top, or peak, of the crest height is known as the crest point.

Ref 5 in FIG. 5—Nasal frontal angle, which can also be thought of as a spread angle, indicating how flared or spread out the nose from a front on point of view. This is measured by finding the angle between the outer edge of the nostril and the central longitudinal axis through the nose.

Ref 6 in FIG. 5—Nasal crest angle, indicating how much the nose projects from the face (i.e. how much the nose points up or down). This is calculated by finding the angle between a line joining the nasal crest to the tip of the nose and a vertical plane.

Further details regarding FIG. 5 can be found in the Appendix.

Turning next to FIG. 6, notable facial markers or reference points are illustrated which are used to calculate the measurements described with reference to FIG. 5, for example ACR represents the nasal crest angle. Further details of FIG. 6 can be found in the Appendix.

Finally, turning to FIG. 7, different splay angles of the nose are illustrated. The splay angle can also be thought of as another form of a spread angle, indicating how flared or spread out the nose from a top down point of view. The splay angle is calculated by finding the angle formed by the centre line of the nose with the position of the distance-between-rim, DBR, of the spectacle frame (which can be thought of as similar to a frame bridge width) at a specified point, typically 10 mm below the horizontal centre line (the imaginary horizontal line formed along the lower eyelid of the wearer). This measurement is important in providing a correctly fitting pair of spectacle frames because the nose-facing surface of the spectacle frame bridge and affixed nosepads should be aligned with the surface of the nose. As such, the angle of the frame bridge and the splay angle of the nose should be substantially the same in order for the bridge of the frame to rest on the bridge of the nose in a manner that provides sufficient surface contact area between the nose and the frame such that the spectacles do not slip down the wearer's nose.

A set of base frame measurements also needs to be determined, providing an initial dataset of frame measurements which can then be adjusted to the wearer's face.

Looking at the frame measurements in more detail, the frame can be thought of as being divided into a number of regions namely the front, the side, the top, and the eye as can be seen in FIGS. 13-16.

With reference to FIG. 13 in which the front of the frame is illustrated, the frame measurements in relation to the shape of the bridge are of particular importance. More specifically, the following frame measurements are made, in which the reference letter below corresponds to the reference letter in FIG. 13:

d—Distance between lenses (DBL), corresponding to the distance between the internal edges of the lens apertures 4—Bridge width line, corresponding to a horizontal reference line positioned 5 mm below the horizontal centre line, HCL, (corresponding to the distance along y-axis where a horizontal line midway between the tangents to the upper and lower edges of the lens is drawn).

5—Bridge width, which corresponds to the minimum distance between the rims, measured along the bridge width line 6—Bridge height, corresponding to the distance from the bridge width line to the lower edge of the bridge and measured along the vertical symmetry axis. The top of the bridge height is defined as the fulcrum position.

FIG. 14 illustrates the side of the frame from which a number of frame measurements can be made, for example the splay angle, AC, corresponding to the angle formed between the frame bridge and a vertical plane passing through the centre of the spectacle frame. Details of further frame measurements which can be made are discussed in the Appendix.

Figure 15:
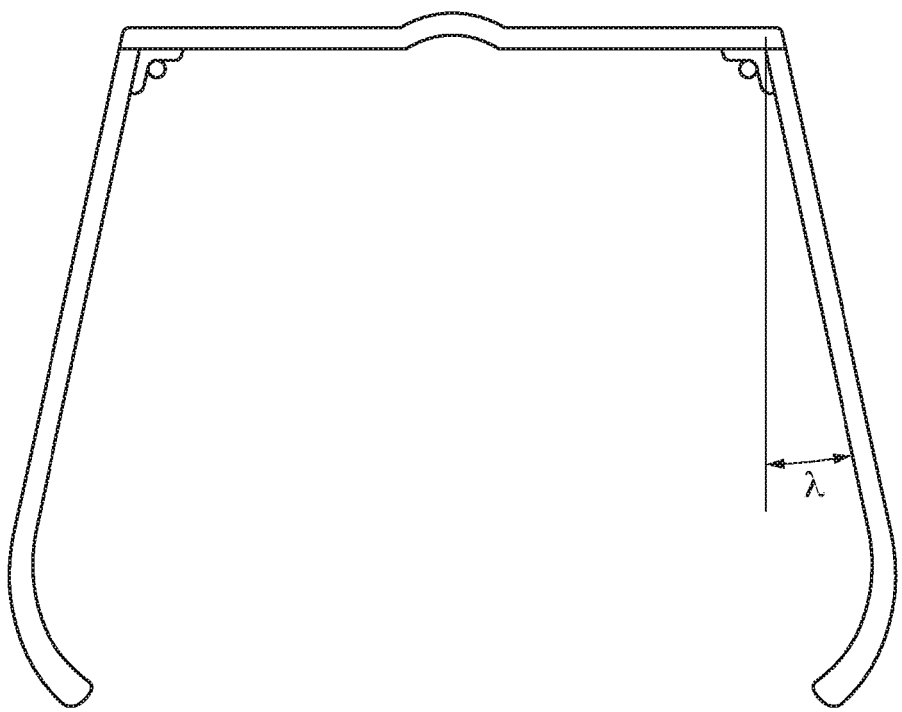
FIG. 15 shows further examples of frame measurements.

FIG. 15 illustrates the top of the frame from which a number of other frame measurements can be made, as discussed in the Appendix.

Figure 16:
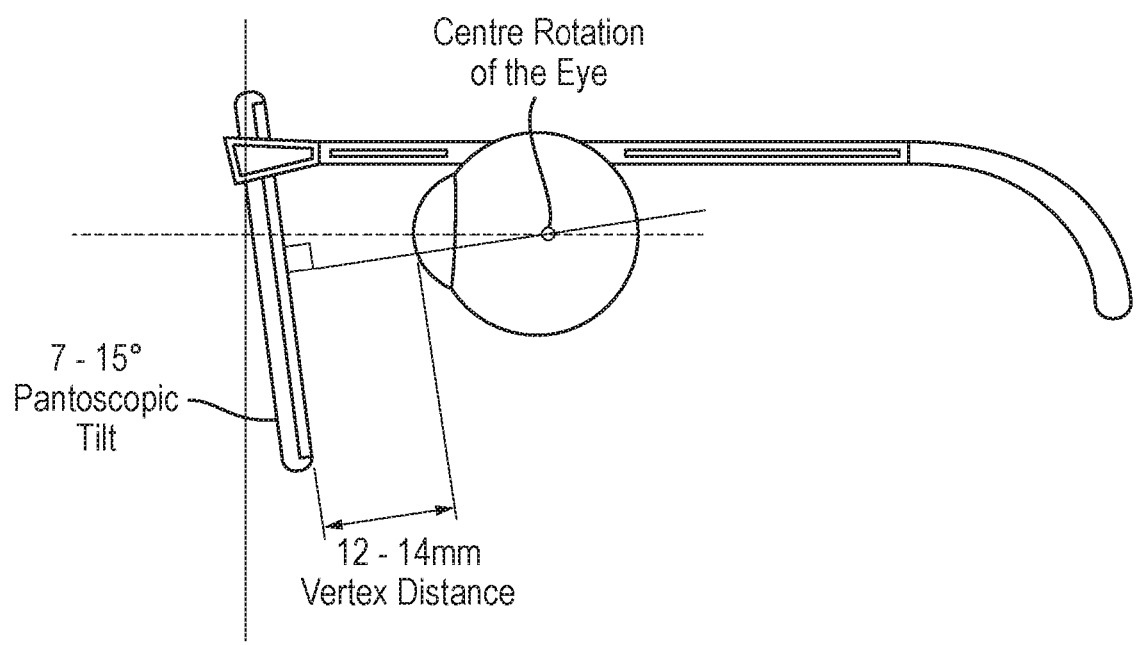
FIG. 16 shows further examples of frame measurements.

FIG. 16 illustrates an eye region of the frame from which a number of further frame measurements can be made, for example the pantoscopic tilt, corresponding to the angle of the lens aperture to the horizontal axis of the eye. Details of further frame measurements which can be made are discussed in the Appendix.

As well as the above described frame measurements, additional frame measurements are also made which correspond to an equivalent facial measurement. These measurements include the following:

Distance between rims DBR at HCL (0 mm); DBR at 5 mm; DBR at 10 mm; DBR at 15 mm—Distance along x-axis between the rims, calculated at different positions along the y-axis. In particular this is calculated with the crest point at the HCL, and the crest point at 5 mm, 10 mm, and 15 mm above the HCL.

Crest height—Distance along the y-axis between the HCL and the crest point which is the mid-point of the bridge Splay angle—This also corresponds to the angle between a normal-to-back plane of the frame front and the pad plane.

Frontal angle—Calculated by finding the angle between a vertical line and the plane of the bridge pads, where the vertical line is a central longitudinal axis through the midpoint of the frame.

As discussed previously, it is important to accurately represent the shape of the nasal bridge and the shape of the frame bridge, in order to determine how a frame bridge will sit on a wearer's nose and subsequently determine what adjustments need to be made to the frame in order that the frame holds the lenses in the correct position relative to the wearer's pupils. That is, accurately predicting the frame sit position on a wearer's face provides the ability to identify how the wearer's pupil will interact with lens when the frame is worn.

To provide an accurate prediction of the frame sit position, a number of other important measurements can be determined, based on the above described frame and facial measurements.

Figure 17:
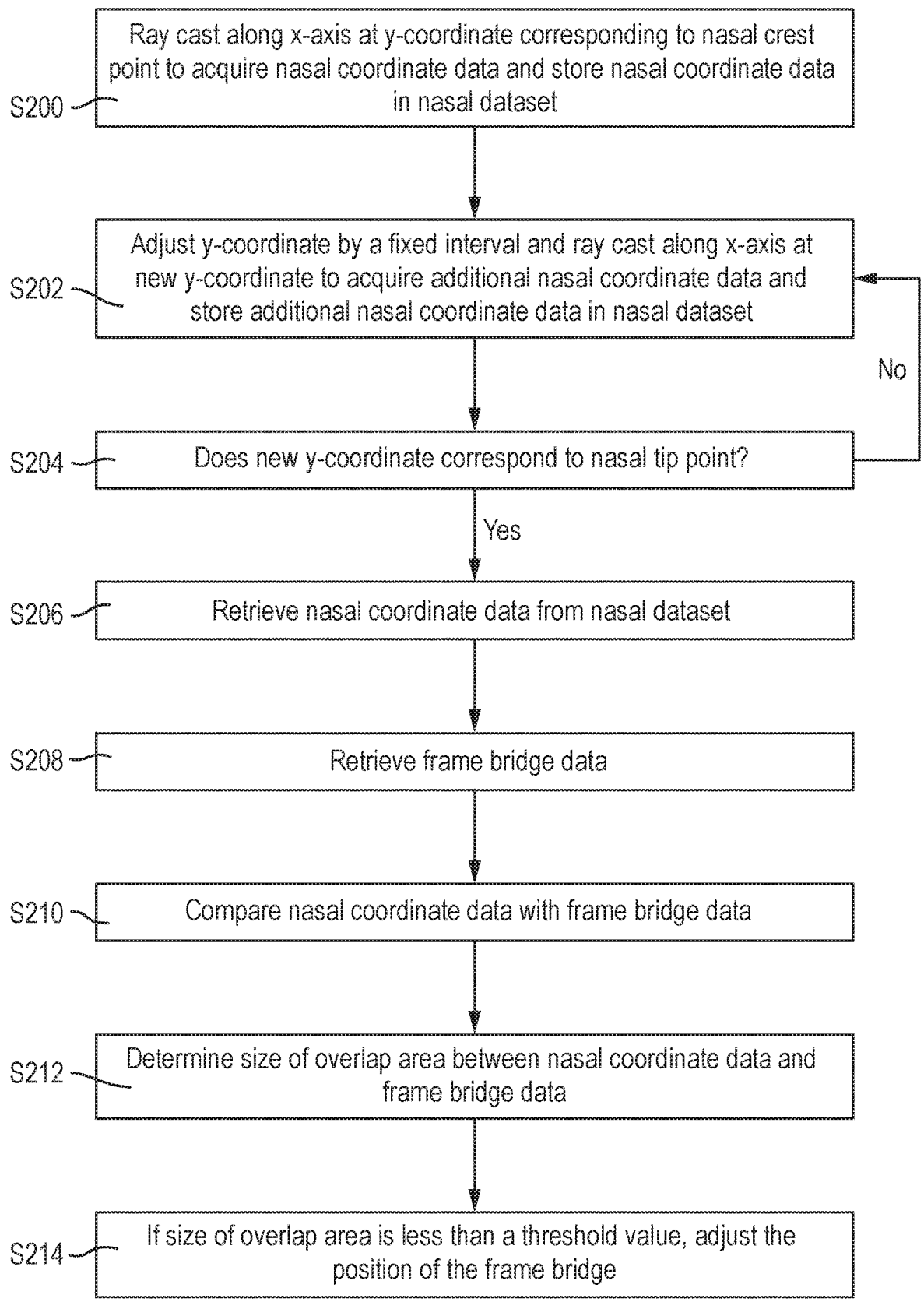
FIG. 17 shows a flow diagram of an advanced DBR calculation.

A modified form of the DBR measurement is made in relation to the face, known as the advanced DBR, which enables a more accurate determination of the sit position for the fulcrum of the frame bridge when placed on the nose. With reference to FIG. 17, this facial measurement is generally calculated by ray casting along the x-axis at pre-determined intervals along the y-axis in order to acquire more measurements along the length of the nose, thus providing a more accurate representation of the size and shape of the nose. By better simulating how a frame sits on the face, in particular on the nose, it is possible to more accurately forecast the positioning of the optical lens in front of the eye.

Figure 18:
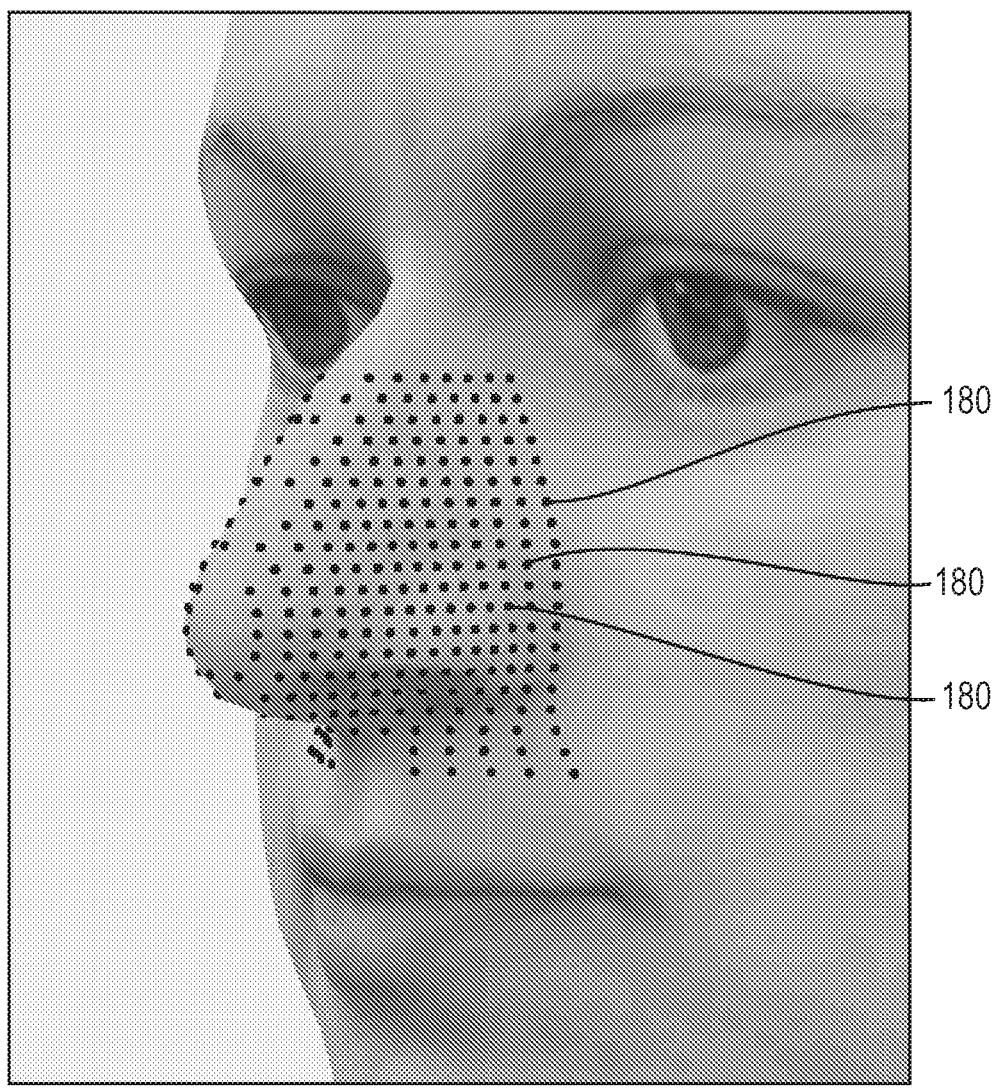
FIG. 18 shows the structure of the nose, divided into layers.

The nose can be considered to be formed of a plurality of nose layers 180, as shown in FIG. 18. Each nose layer can be thought of as corresponding to a vertical slice through the nose, and so each nose layer is associated with a particular z-axis coordinate. The layers are typically equally spaced apart from each other in the z-axis so that each nose layer typically has the same thickness. The number of nose layers associated with a particular nose may depend on the size of the nose. Each nose layer generally takes the form of a triangle, the triangle having sides defined by x- and y-axis coordinates and the triangle being located at a certain z-axis coordinate. Each nose layer forms a part of the advanced DBR measurements, and the overall structure of the nose can be built from these layers.

The ray casting begins at the nasal crest point and ends at the nose tip. Starting at the y-coordinate corresponding to the crest point S200, a ray is cast along the x-axis and the z-axis position of different parts of the nose along the x-axis can be determined. The combination of the determined z-axis coordinate data and different x-axis positions for a given y-axis position forms a set of nasal coordinate data which can be stored in a nasal dataset. The y-coordinate is then adjusted S202 by a fixed interval (for example a 1 mm interval) and the ray casting process is repeated to acquire new nasal coordinate data at the new y-coordinate. This additional nasal coordinate data is added to the previously recorded nasal data in the nasal dataset. The ray casting process is repeated S204 along the length of the nose by adjusting the y-coordinate and collecting nasal data at the new coordinate, until the y-coordinate corresponds to the tip of the nose.

Once all the nasal coordinate data has been acquired, the nasal dataset comprises a set of 3D-coordinate data which represents the shape of the nose S206. In other words, the advanced DBR measurement comprises a 3D data cloud of points, comprising the plurality of nose layers, which represent the structure (e.g. size and shape) of the nose. Data corresponding to the shape of the frame bridge is then retrieved S208, also known as frame bridge data. This data includes the splay angle, bridge width line, bridge width, and bridge high as described previously with reference to FIG. 13.

The frame bridge data comprises a set of 3D-coordinate data which represents the shape of the frame bridge. In order to determine whether the frame bridge is appropriately shaped to the wearer's nose the frame bridge can be projected onto the nose and the resulting fit can be assessed. In particular, both the structure of the nose and the structure of the frame bridge can be conceptually mapped in 3D, the 3D maps corresponding to the datasets of xyz-coordinates representing the respective structures, and these structure maps can be compared to each other to determine how the frame bridge would sit on the nose S210.

From this comparison, it is possible to determine the amount of overlap S212 between the surface area of the frame bridge and the surface area of the nose i.e. the size of the contact surface area, using the nasal coordinate data and frame bridge data. The amount of overlap is a key metric in assessing whether a spectacle frame is suitably sized for a particular wearer.

Along the z-axis, the lenses should close as possible to the eyes, minimising the distance from the cornea (the wearer's eyelashes should just clear the back surfaces of the lenses), known as the vertex distance (VD), sometimes called the back vertex distance. The starting point for the position of the lens should align with the testing equipment used to take the refraction, which typically set at a VD of 12.5 mm.

By projecting the bridge shape of the frame onto the advanced DBR measurements it is possible to detect the collision position, which is the position where the frame and nose meet. The collision position must create a sufficient surface contact area in order to prevent the spectacle frame from slipping down the nose.

After the comparison, if the size of the contact surface area is too small i.e. less than a threshold value, defined in accordance with British Standards BS EN ISO 12870:2014 then the position of the bridge on the nose can be adjusted S214 to increase the contact surface area, ensuring that the spectacle frame does not slip down the wearer's nose. In particular, adjustments are made to the DBR at different points along the nose, the frontal angle, the crest angle, and the splay angle. The final collision position (in xyz-coordinates) is then sent to the Fit Engine API as the most likely physical position of the frame bridge.

When determining the most likely physical position of the frame bridge on the nose, it is important to ensure that other parts of the spectacles frame (for example the lower edge of the rims) does not collide with parts of the wearer's face (in particular their cheeks and forehead). These collision points may be referred to as undesirable collision points, because any contact between the frame and these part of the wearer's face will be uncomfortable for the wearer.

In order to firstly detect and secondly avoid these undesirable collision points, the frame bridge is initially positioned at the nasal crest point (which is where the first advanced DBR measurement is taken). The frame bridge z-axis coordinates correspond to the nose layer coordinates. The frame bridge x-axis position is the average x-axis position of the nose, so that the frame bridge is initially cantered on the nose.

To detect an undesirable collision point, the frame bridge position is translated in the y-axis until the coordinates representing the frame bridge position pass through a nose layer (which correspond to coordinates representing the outer surface of the nose, as seen in FIG. 18). At this point there is an undesirable collision. The position of the frame ridge can then be adjusted in the x-axis left and right to determine the position at which the frame collides with a wearer's cheeks. This process is repeated for each position along the z-axis. A similar technique is used to determine if there is a point on the nose at which the top part of the spectacles frame comes into contact with the wearer's forehead. By taking these undesirable collision points into account, a final frame size can be determined which ensures that the frame does not come into contact with parts of the wearer's face, which will prevent the spectacles frame from sitting correctly on the wearer's nose and so the lenses will not be optimally aligned with the wearer's pupils. Thus, by taking increased numbers of measurements along the length of the nose a more detailed determination of the structure of the nose and the frame bridge can be made and so the collision position can be more accurately determined and subsequently adjusted to suit the wearer.

The advanced DBR measurement is therefore critical in providing a well-fitting spectacle frame which has been sized to the wearer's head. In particular, the advanced DBR enables accurate prediction of the frame position on the wearer's face, in use, which enables accurate estimation of the lens position relative to the pupil, in use, and so accurate adjustment of the frame can be made in order to adjust the position of the lens relative to the pupil such that the lens provides optimal optical correction to the wearer.

Some nasal bridge shapes cause the bridge of the nose to sit above the fulcrum position on the frame. In order to correct for this effect, a fulcrum offset is calculated. The fulcrum offset is the difference between where the frame bridge should touch the nose and where the frame bridge actually touches the nose. Each frame has a fulcrum offset which can be calculated so the Fit Engine API knows where to correctly place the frame in relation to the sit position, which may also be referred to as the collision position. The sit position is calculated as a sum of the fulcrum position and the fulcrum offset.

Before a spectacle frame can be adjusted, a starting point or base frame is needed which can then be modified. Since the frame bridge is an important feature of a frame to customise, a universal bridge measurement is first made which can then be tailored to each individual. The universal bridge is a generic bridge shape. In order to provide a tailored pair of frames, the universal bridge shape is taken as a start point and then adjusted to suit the particular individual based on their facial measurements. Adjusting the bridge improves the sit position of the frame on the wearer's nose by ensuring that the frame bridge is sufficiently supported by the wearer's nose such that the spectacles are steady on the wearer's face. In particular, the splay and crest angles of the frame bridge can be adjusted based on the corresponding facial measurements taken from the facial scan. Pad height is defined by satisfying conditions related to the Crest height e.g. if crestHeight<x, then set padHeight=y mm, where the height is measured in the y-axis and x represents an average or typical value of the crest height across the general population. It is important that the part of the frame that touches the nose has a large contact surface area, and so the pad height can be adjusted to ensure that there is sufficient surface area between the spectacle frame and nose making the frame stable on the wearer's face.

A well-fitting frame must hold the lens in a position that provides the best visual correction possible for a particular wearer. It is therefore important to consider the position of the lens during the frame adjustment process to ensure that the lens optics are optimal for the wearer.

The fit model can be applied to a number of different lens types including single vision, progressive lenses, bifocals, and non-prescription lenses.

An important measurement in determining the ability of the lens to provide suitable correction is the lens height. In other words, it is important to provide the correct vertical placement of the optical centres of the lenses relative to each pupil in order to minimise the effects of aberrations and prismatic effects. As such, lens height position compared to the centre of the pupil is generally considered an essential measurement in order for the lens to provide the required optimal correction for the wearer, although in practice it is particularly important in the case of high index lenses and progressive lenses/bifocals—the latter which requires an accurate measurement of the 'as worn' lens position, to ensure the relative lens power or segments is aligned with the wearer's pupil.

Figure 8:
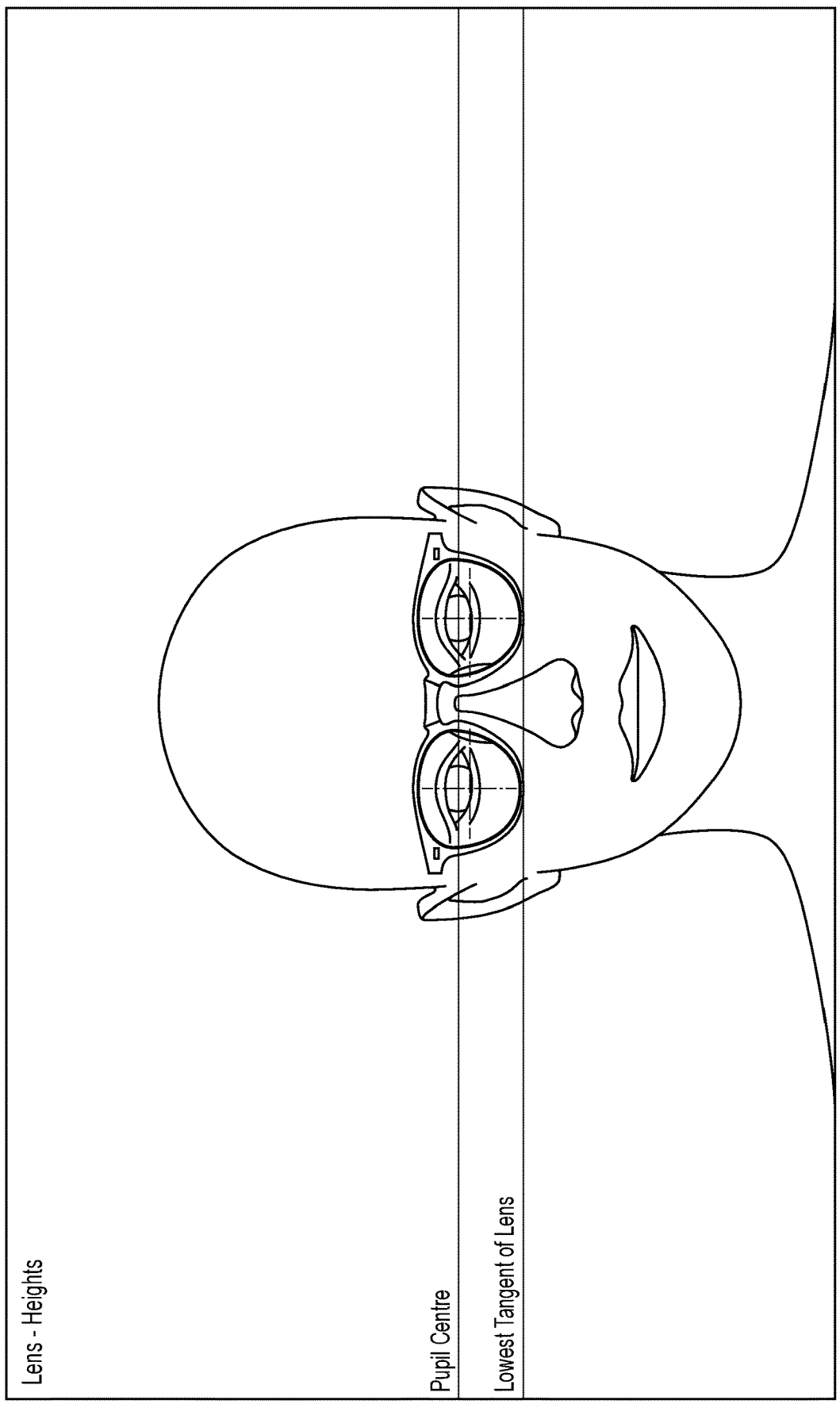
FIG. 8 shows examples of frame measurements.

The lens height is calculated by measuring the distance in the y-axis between the lowest tangent of the rim of the lens and the pupil centre, as illustrated in FIG. 8. The lens height is therefore independent of the vertical length of the overall lens, and represents the distance between the lowest part of the lens and the point on the lens corresponding to the height of the pupil centre. A separate measurement is taken for each eye because it is not always the case that this measurement will be the same for the left and the right eye, as the left eye and right eye are not always at the same height on a person's face.

When the pupil corresponds to the optical centre of the lens, there should be no pantoscopic tilt. Any lens tilt added will change the sphere power of the lens and cause an unwanted cylinder component to be manifested. For low power lenses, the power effect is negligible, but with a higher power lens it can be quite evident. To avoid adversely affecting the optical performance of a single vision lens, for every millimetre that the optical centre is below the wearer's line of sight, there must be 2 degrees of pantoscopic tilt. For example, as pictured in FIG. 9*a*, the optical centre falls 4 mm below the lenses, requiring 8 degrees of pantoscopic tilt in relationship to the plane of the face.

As has been explained, some measurements are taken on both the face and frame and relate directly to one another.

These measurements include DBR, crest height, bridge height, frontal angle, splay angle, head width, and temple width. Measurements which are made on the face only but relate directly to one or more frame measurement include the apical radius, and crest angle. Measurements which are made only on the frame but relate directly to one or more face measurement include the distance between pad centres on the frame. The frame measurements relating to the frame sides and their adjustment include the let-back angle, the length-to-bend, length of drop, and the total length of the side.

Once all the above described measurements have been taken, defining a set of facial measurements, and a set of base frame measurements have been acquired from a database of standard frame measurements, the process of adjusting the frame measurements to more closely fit the wearer's head is carried out.

The base frame is selected by comparing the facial measurements of the wearer with corresponding measurements of the available base frames and finding the closest initial match between facial and frame measurements.

Once the base frame has been acquired from the database, the fit rules are then applied S110 by the fit model in order to adjust the base frame for the particular user to provide a tailored spectacle frame, as will be discussed in more detail below. Once the fit rules have been applied, these can be used to define the fit recommendations S112 for the wearer's frame. The fit recommendations are a set of recommended frame measurements or sizes which are calculated by applying the fit conditions S110. In particular, the recommendations are defined as the styles of frames and sizes of these frames, for which the position of the lens relative to the pupil satisfies the fit conditions for the four main areas.

The four main areas which comprise fit rules, that are used to produce the recommended list of frame to the wearer, will now be discussed in turn.

Optical Centre Position

Ensuring that the frame can position the optical centre of the lens in an optimum position, based on:
  z-axis position, placing the lens as close to the eye as possible to maximise field of view, and minimise VD subject to eyelashes
  x-axis position, placing the optical centre in front of the pupil, at a minimum position of the horizontal centre
  y-axis position, placing the optical centre in front of the pupil, with the vertical centre at or close to the HCL, with a minimum height calculation for progressive lenses (typically 22.0 mm)

Figure 10:
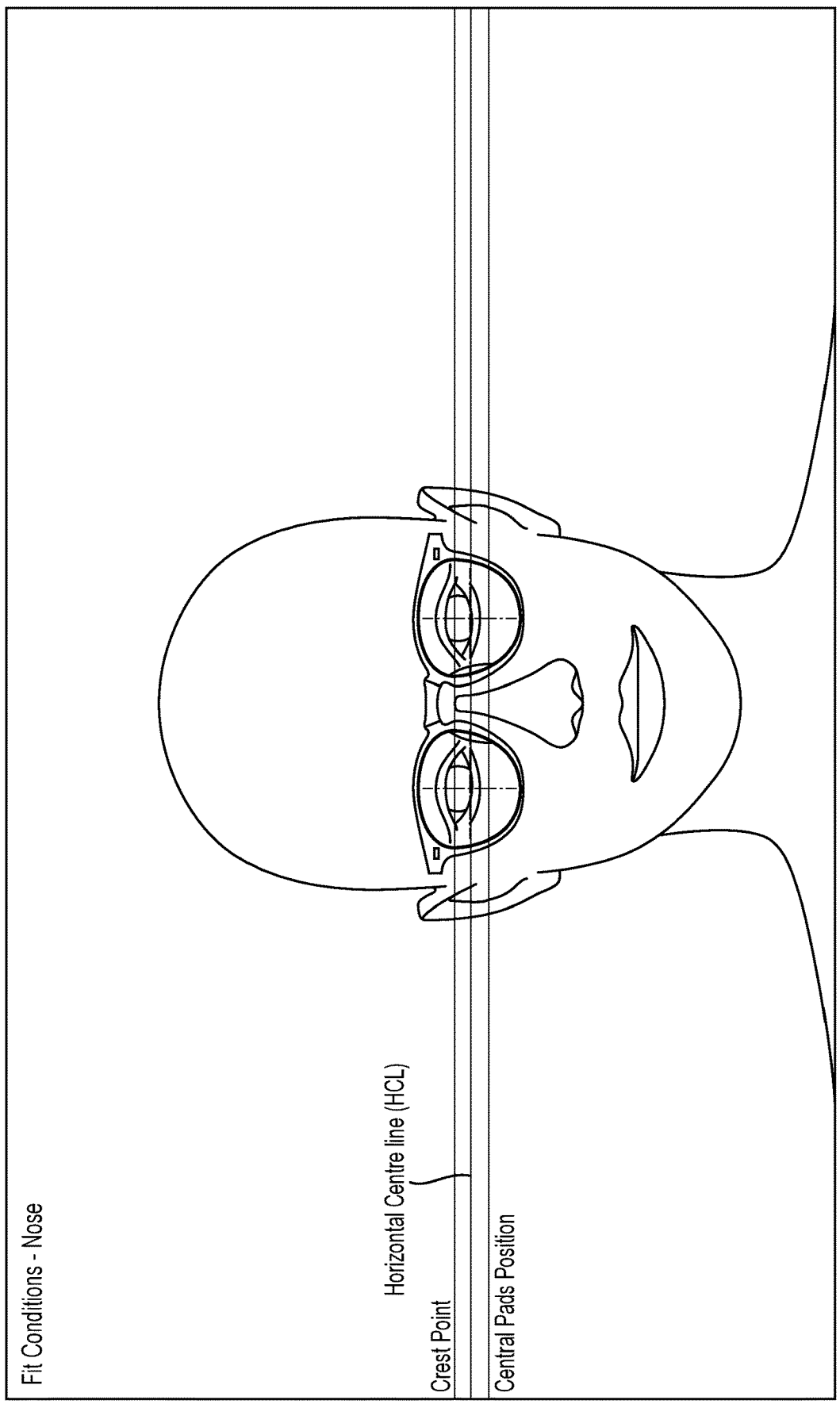
FIG. 10 shows examples of fit conditions applied to the nose.

The fit condition of the frame position in relation to the nose can then be determined, as illustrated in FIG. 10.

Size of Lens

The size of the lens will dictate the overall size of the frame and therefore is a crucial component the fit condition of frame size.

In relation to the facial dimensions, an applicable fit rule is that a good fit of the spectacle frame in relation to the facial dimensions is defined by comparing the geometric centre distance of the frame to the pupillary distance of the wearer along the axis—the former should be at least as large as the former.

The length-to-length (LTL) width is also compared to the wearer's sphenoid width along the axis, and serves as a starting point for assessment of fit.

Figure 12:
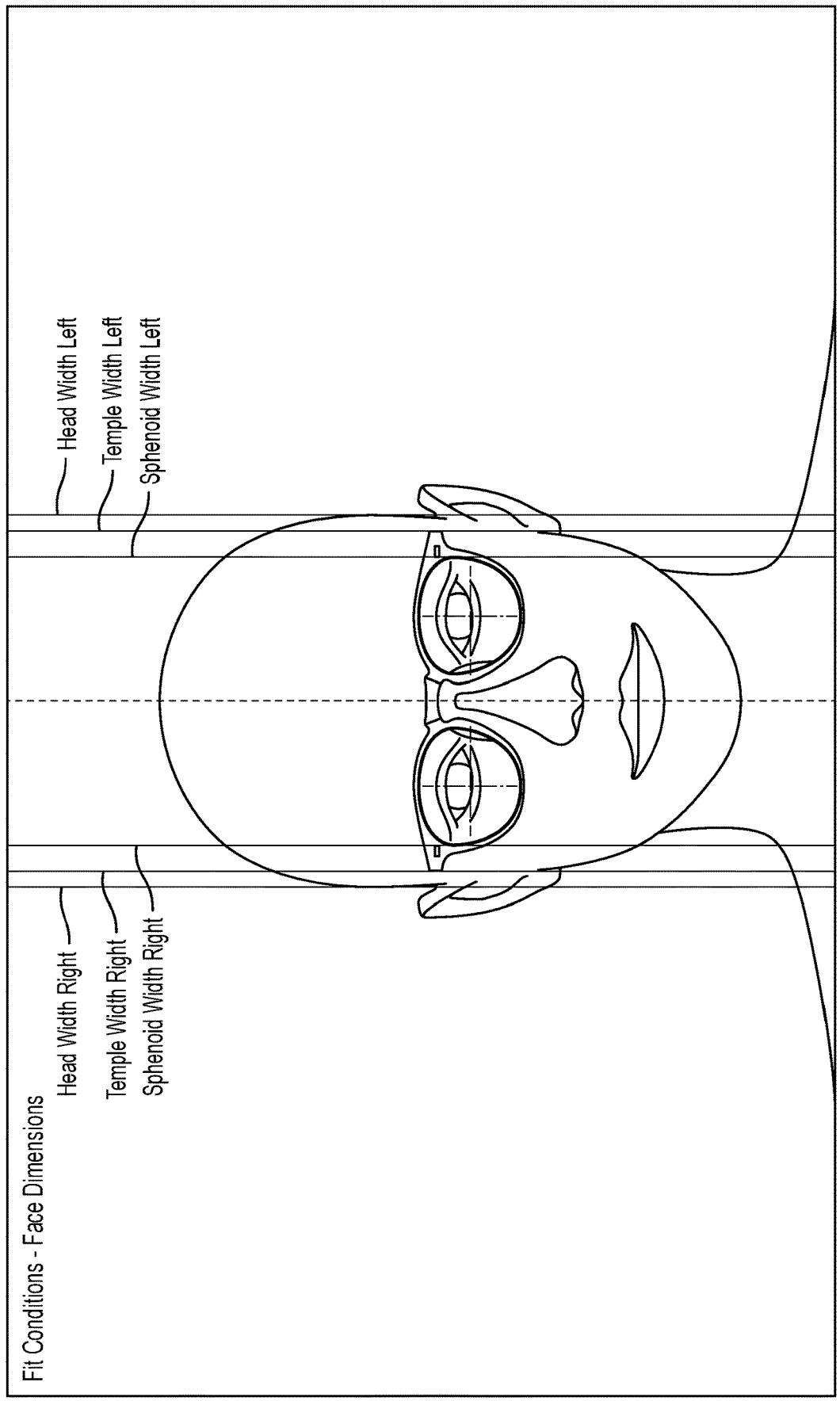
FIG. 12 shows examples of fit conditions applied to the face.

The fit condition of the lens and frame width relative to the face is illustrated in FIG. 12.

A wearer may wish to increase the size of the lens and the frame based on aesthetic or style considerations, subject to maximum thresholds (based on the maximum blank size of a lens, weight and comfort, or a length depth based on the relative position of cheekbones).

Angle of Lens

Ensuring the pantoscopic tilt at the optical centre is zero degrees
Matching the 'as worn' angle of side with the wearer's tilt
To do this, we're require a more accurate view of the relative position of the ears
See FIG. 9.

Assessing Correct Temple Length

Figure 11:
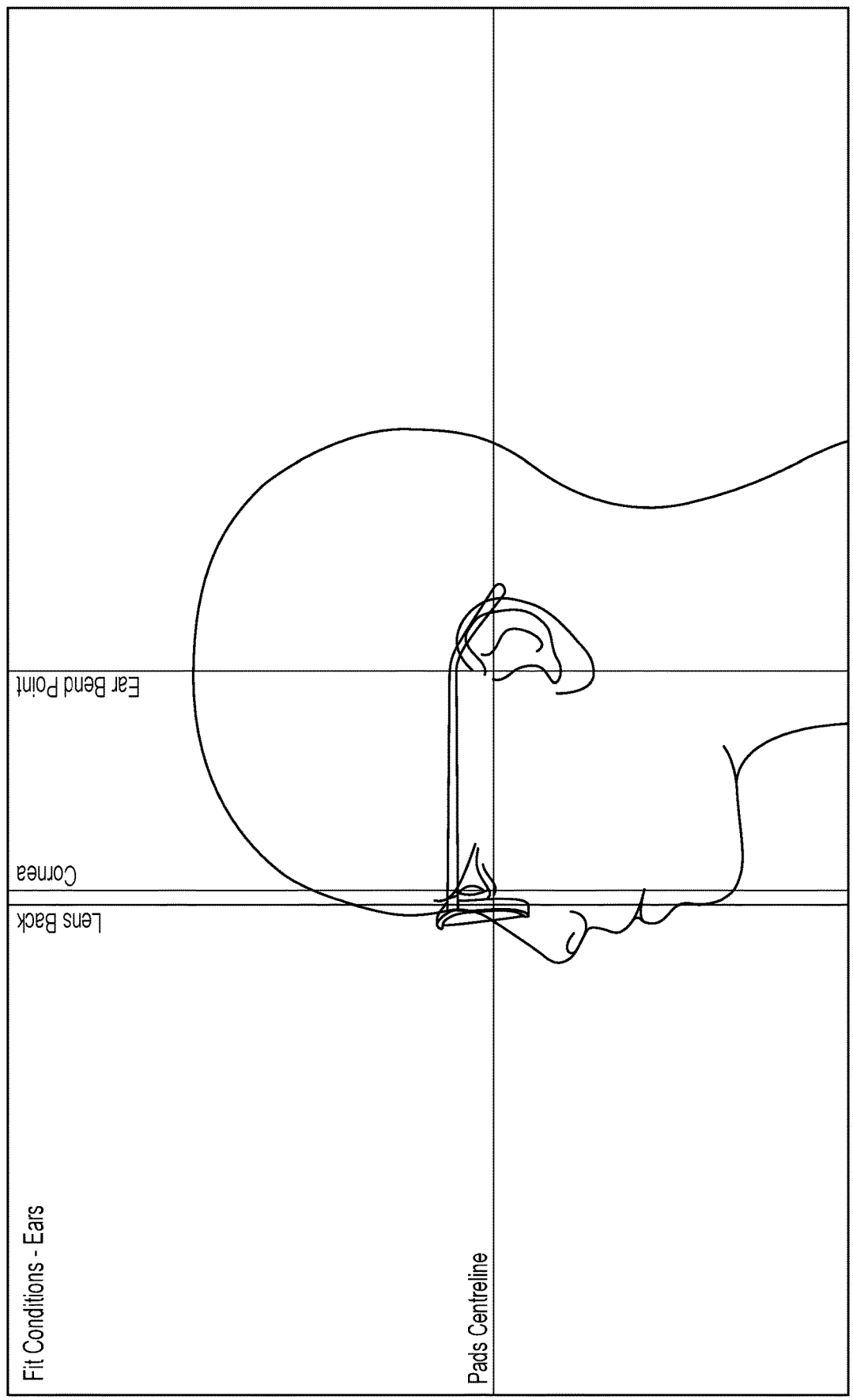
FIG. 11 shows examples of fit conditions applied to the ears.

Turning towards the ear region next, a fit rule applicable to this region is that a good fit on the ears is defined by comparing the position of the frame with the ear bend position along the x-axis. The fit condition of the frame position in relation to the ear can then be determined, as illustrated in FIG. 11. The optimal temple length is sufficient so the length to bend is at least as long as the length in x-axis from the back of the lens plane to the start of the ear.

Assessing Head Fit

Estimating head width, temple width and let back angle
Frame HW can then be estimated as a "compensated" measurement ~10 mm less than measured HW to provide lateral grip.
Temple width on the frame is measured between the sides 25 mm back from the plane of the front
Let back can then be a calculated measurement between head width and temple width, with a check that there are no occlusion points with the wearer's side of head By applying each of these rules in turn, the base frame measurements are adjusted until the fit conditions are satisfied, which provides a better fitting frame for the wearer. The fit model then provides a set of recommendations, comprising at least one recommended spectacle frame based on an optimised base frame, the recommended frame being categorised by the fit conditions. The wearer can then select S114 a frame from the set of recommended frames.

The fit model rules are used to provide a set of recommendations for the frame sizes best suited to providing a frame in which the lens position in relation to the eye is optimal for the wearer. The wearer in question will be presented with a list of frames, via a display screen of the computing system 100, which includes the recommended frames, as well as frames which are not recommended for that user. Frames which satisfy the fit conditions (e.g. Good and Perfect) for all four of the main areas (nose, ears, facial dimensions, and lens) are presented to the wearer as recommended frames. Frames which do not satisfy the fit conditions for any of the four main areas are presented to the wearer as not recommended. Frames which satisfy at least one fit condition but do not satisfy at least one other fit condition are presented to the wearer as average-fitting. The frames in the list of frames are ordered based on how closely they satisfy the fit conditions.

In summary, the fit model rules are used to guide the creation of the specific tailored spectacle frame. The dimensions of the different parts of the spectacle frame are adjusted until all the fit conditions are satisfied for the nose, ear, facial dimension, and lens fit rules.

Once the wearer has selected their frame they can chose to further customise S116 the frame from an aesthetic perspective. Once the final frame has been settled on by the wearer, the fit model API accesses the prescription S118 which the wearer uploaded to the computing system and then selects the lens S120 corresponding to the wearer's prescription. The fit model API then generates a frame specification file S122 along with a paper confirmation S124 of the final frame and lenses. The frame specification file is then sent to a manufacturer of spectacle frames S126, who constructs the wearer's pair of spectacles.

As the skilled person will appreciated, any and all steps described herein can be implemented by a computer comprising at least a processor and memory. The facial landmark location can be output for example output to a display, sent over a network to another device, or printed. In some cases, the output can be used, in combination with other data, by a 3D printer to print a pair of glasses that have been specifically measured and designed for a user's face.

In some examples, the invention can also use the aforementioned machine learning techniques to produce a colour and/or style recommendation. Generally, the same process as has been described in relation to locating the landmark positions (in particular the ears and eyes) is used to produce a colour and/or style recommendation but the output will be different.

Briefly, in order to produce a frame style recommendation, three dimensional estimates (for example in the form of a mesh) of one or more landmark positions are obtained from a neural network operating on a cylindrically projected depth map representation of the scan data, as described previously. The landmark positions may include (but are not necessarily limited to) eye locations, eyebrow locations (which may be measured at five points along each eyebrow), cheek locations, jawline location (which may be measured at five points from apex of chin to bottom of ear). Shape data is then extracted from the coordinate data around the landmark locations (e.g. 5 mm around the landmark location) to obtain curvature estimates at each point. The landmark positions are reduced in dimensionality using example data from a set of head scans as a basis. Here, ten basis vectors to be passed forward for ongoing analysis are selected so to as to maximise the variance accounted for by the basis vectors. The design of the frame to be manufactured is reduced to a set of numbers based on measurements of the curve of the frame at multiple points around its perimeter. The frame design is reduced in dimensionality using as the basis an example set of frame designs. A neural network operates on the reduced dimensionality landmark positions and frame design data. The neural network is adjusted to fit a set of example scores from a panel of volunteers. The output of the neural network is the frame style (for example in the form of a numerical score) for the individual.

Briefly, in order to produce a frame colour recommendation, input data is acquired comprising a three dimensional coordinate data (for example in the form of a mesh) and a two dimensional image (for example a colour texture map) representing colour at different points on the mesh. Three dimensional estimates of landmark positions are obtained from a neural network operating on a depth map representation of the scan data. Two dimensional estimates of landmark positions on the texture data are obtained by projecting the three dimensional estimates obtained previously, onto the texture image. The texture image is sampled to obtain colour data at each landmark point. The landmark points used for colour recommendation include forehead, left and right cheekbones, eyes (e.g. 5 mm diameter circle centered on the pupil), hair (which may be taken as a point 20 mm above ear points). A neural network operates on the extracted colour patches and the HSV value of the colour. This neural network is adjusted to fit a set of example scores from a panel of volunteers. The output of the neural network is the frame colour (for example in the form of a numerical score) for the individual.

APPENDIX

FIGS. 5 and 6 illustrate a number of different facial measurements that can be determined from the 3D head scan.

In relation to FIG. 5, the following facial measurements can be determined, wherein the number of the facial measurements corresponds to the reference numeral of the measurement in FIG. 5:

4. Apical radius, corresponding to the radius of the arc at the top of the nose.
5. Facial horizontal centre line (F-HCL), corresponding to a horizontal line across the nose which generally sits along the lower eyelid (lower limbus).
6. Facial distance between rims (F-DBR) at HCL, which is substantially the same as the F-HCL. The F-DBR measurement can also be taken at different positions along the nose, for example at 5 mm, 10 mm, and 15 mm, these distances representing offsets down the nose in mm from the F-HCL.
7. Nasal crest height, corresponding to the vertical height in the y-direction where the nose starts ('crest) relative to the F-HCL. This measurement can be thought of as where the nose starts relative to the bottom of the eye (the lower eyelid). The top, or peak, of the crest height is known as the crest point.
8. Nasal frontal angle, which can also be thought of as a spread angle, indicating how flared or spread out the nose from a front on point of view. This is measured by finding the angle between the outer edge of the nostril and the central longitudinal axis through the nose.
9. Nasal crest angle, indicating how much the nose projects from the face (i.e. how much the nose points up or down). This is calculated by finding the angle between a line joining the F-HCL and the tip of the nose and a vertical plane.
10. Facial length-to-bend, corresponding to the distance between substantially the nasal bridge to the ear. In other words, this is the distance of the portion of the spectacle frame, starting from the hinge of the frame and ending at the start of the bend in the frame arm.
11. Facial head width, corresponding to the width along the x-axis of the wearer's head, typically measured as the distance between the wearer's ears and measured at the height corresponding to the top of the ears. Headwidth is measured between the "ear points" and corresponds to the distance between the midpoint of each bend on the frame. It is not the widest point of the head. Frame head width is normally "compensated" to be ~10 mm less than measured head width to provide lateral grip.
12. Facial temple width, corresponding to the distance along the x-axis between the wearer's left and right temples at the side of their head. Related to this measurement is the sphenoid width which is the distance along the x-axis between the left and right sphenoid bones (approximately the edges of the eyebrows). Optical standards dictate temple width on the frame to be measured between the sides 25 mm back from the plane of the front
13. Pupillary distance, corresponding to the distance between the centre point of each pupil.

Turning next to FIG. 6, notable facial markers or reference points are illustrated which are used to calculate the measurements described with reference to FIG. 5. In particular, the following reference points are marked, wherein the letters of the reference point correspond to the reference letter of the feature in FIG. 6:

- S—Sphenoid, relevant to facial temple width and sphenoid width.
- T—Temple, relevant to facial temple width
- A—Ear bend point, relevant to facial length-to-bend and facial head width
- I—Length to bend,
- L.P.—Centre line of pupil, relevant to pupillary distance
- L.C.—Facial horizontal centre line (F-HCL), relevant to F-HCL and F-DBR
- ÂCR—Nasal crest angle
- i—Pantoscopic tilt
- P.M.—Plane of the frame With reference to FIG. 13 in which the front of the frame is illustrated, the following frame measurements can be made, in which the reference letter below corresponds to the reference letter in FIG. 13:

- CR, CL— Right and left centre, corresponding to a centre point of the right and left lens apertures of the frame
- a—Horizontal lens size, corresponding to the width of a lens aperture
- b—Vertical lens size, corresponding to the height of a lens aperture
- d—Distance between lenses (DBL), corresponding to the distance between the internal edges of the lens apertures
- 1—Frame horizontal centre line (HCL), corresponding to the distance along y-axis where a horizontal line midway between the tangents to the upper and lower edges of the lens is drawn.
- 2R, 2L—Right, left vertical centreline, corresponding to a vertical line passing through the centre point of each lens aperture
- 3—Vertical axis of symmetry of the front of the frame
- 4—Bridge width line, corresponding to a horizontal reference line positioned 5 mm below the HCL
- 5—Bridge width, which corresponds to the minimum distance between the rims, measured along the bridge width line
- 6—Bridge height, corresponding to the distance from the bridge width line to the lower edge of the bridge and measured along the vertical symmetry axis. The top of the bridge height is defined as the fulcrum position.
- 7—Lens-to-lens width (LTL), calculated as (lens width×2 plus bridge width minus 1)

With reference to FIG. 14 in which the side of the frame is illustrated, the following frame measurements can be made, in which the reference letter below corresponds to the reference letter in FIG. 14:

- 1—Axis of hinge joint (for example a dowel screw) axis, wherein the joint connects the frame arm to the frame front
- 2—Median plane of hinge joint
- 3—Centreline of side, corresponding to a horizontal line passing through the central longitudinal axis of the frame arm
- 4— Length-to-bend length, corresponding to the distance between the hinge joint and the bend in the frame arm
- 5— Drop length, corresponding to the length of the part of the frame arm which extends beyond the bend in the frame arm
- I—Overall length of side, corresponding to the sum of dimensions 4 and 5 (i.e. the sum of the length-to-bend length and the drop length)
- X—Detail of the measurement position at the joint
- FTB— Front-to-bend length, corresponding to the distance between the back plane of the frame front and the side bend.
- AC—Splay angle, corresponding to the angle formed between the frame bridge and a vertical plane passing through the centre of the spectacle frame.

With reference to FIG. 15 in which the top of the frame is illustrated, the following frame measurements can be made, in which the reference letter below corresponds to the reference letter in FIG. 15:

- λ—Let-back angle, corresponding to the angle between the side (frame arm) and a normal line through the frame front With reference to FIG. 16 in which an eye region of the frame is illustrated, the following frame measurements can be made:

- Vertex distance (VD), which is sometimes called the Back Vertex Distance (BVD), corresponding to the distance between the pupil and the point of the frame representing the visual point of a lens (the point where the visual axis of the wearer's eye intersects the back surface of the correcting spectacle lens). The vertex distance is measured along the visual axis.
- Pantoscopic tilt, corresponding to the angle of the lens aperture to the horizontal axis of the eye
- Pantoscopic angle, corresponding to the angle of the frame front to the temple

The invention claimed is:

1. A computer-implemented method of adjusting a spectacle frame for a user to provide a customised spectacle frame, comprising the steps of
    receiving input data comprising three-dimensional coordinate data representing a user's head;
    identifying a plurality of landmark locations within the input data, wherein a landmarks location corresponds to a three-dimensional position of a facial feature;
    determining a set of facial measurements based on the plurality of landmark locations by calculating at least one measurement associated with at least one landmark location;
    retrieving a set of frame measurements representing a base spectacle frame from a database of frame measurements;
    comparing the set of facial measurements with the set of frame measurements;
    adjusting at least one frame measurement in the set of frame measurements based on the comparison;
    outputting a data file comprising a set of adjusted frame measurements;
    wherein the set of adjusted frame measurements comprises a lens height measurement and the adjusting comprises adjusting the lens height measurement from an initial value to an adjusted value.

2. The method of claim 1 wherein the set of facial measurements comprises a plurality of nasal measurements representing the 3D structure of the nose.

3. The method of claim 2 wherein the plurality of nasal measurements comprise a plurality of distance between rim, DBR, measurements, wherein each DBR measurement is taken at a different y-axis location along the length of the nose.

4. The method of claim 2 wherein the plurality of nasal measurements are obtained by:
    ray casting along an x-axis at a first y-coordinate to acquire nasal coordinate data and storing the nasal coordinate data in a nasal dataset;

adjusting the first y-coordinate by an interval to a second y-coordinate and ray casting along the x-axis at the second y-coordinate to acquire additional nasal coordinate data and storing the additional nasal coordinate data in the nasal dataset;

retrieving the nasal coordinate data from the nasal database;

retrieving frame bridge data;

comparing the nasal coordinate data with the frame bridge data;

determine a size of an overlap area between the nasal coordinate data and the frame bridge data;

if the size of the overlap is less than a threshold value, adjusting at least one frame measurement.

5. The method of claim 1 wherein the comparing comprises mapping the set of frame measurements onto the set of facial measurements and identifying a subset of frame measurements which need to be adjusted.

6. The method of claim 5 wherein the subset of frame measurements comprises at least one frame measurement related to a bridge of the spectacle frame.

7. The method of claim 5 wherein the subset of frame measurements comprises at least one measurement related to the position of a lens segment within the spectacle frame.

8. The method of claim 1 wherein the adjusting the lens height measurement comprises separately adjusting a lens height measurement associated with the user's left pupil and a lens height measurement associated with the user's right pupil.

9. A computer system configured to adjust a spectacle frame for a user to provide a customised spectacle frame, comprising:
  a receiving module configured to receive input data comprising three-dimensional coordinate data representing a user's head;
  a processor configured to:
    identify a plurality of landmark locations within the input data, wherein a landmark location corresponds to a three-dimensional position of a facial feature;
    determine a set of facial measurements based on the plurality of landmarks locations by calculating at least one measurement associated with at least one landmark location;
  a retrieving module configured to retrieve a set of frame measurements representing a base spectacle frame from a database of frame measurements;
  the processor further configured to:
    compare the set of facial measurements with the set of frame measurements;
    adjust at least of frame measurement in the set of frame measurements based on the comparison;
    output a data file comprising a set of adjusted frame measurements;
    wherein the set of adjusted frame measurements comprises a lens height measurement and the adjusting comprises adjusting the lens height measurement from an initial value to an adjusted value.

10. The computer system of claim 9 further comprising a scanning module configured to scan a user's head and generate input data, and further configured to send the input data to the receiving module.

11. The computer system of claim 10 wherein the scanning module comprises a camera and a signal emitter, wherein the signal emitter is configured to emit a plurality of signals at the user's head and the camera is configured to detect the emitted signals.

12. The computer system of claim 11 wherein the signal emitter comprises an infrared emitter and the camera comprises an infrared camera.

13. The computer system of claim 10 wherein the scanning module comprises a LiDAR camera.

* * * * *